(12) United States Patent
Majumder et al.

(10) Patent No.: US 10,835,873 B2
(45) Date of Patent: Nov. 17, 2020

(54) GRAPHENE OXIDE MEMBRANES AND METHODS RELATED THERETO

(71) Applicant: Monash University, Clayton (AU)

(72) Inventors: Mainak Majumder, Clayton (AU); Abozar Akbarivakilabadi, Clayton (AU)

(73) Assignee: MONASH UNIVERSITY, Clayton (AU)

(*) Notice: Subject to any disclaimer, the term of this patent is extended or adjusted under 35 U.S.C. 154(b) by 0 days.

(21) Appl. No.: 15/525,923

(22) PCT Filed: Nov. 19, 2015

(86) PCT No.: PCT/AU2015/000698
§ 371 (c)(1),
(2) Date: May 10, 2017

(87) PCT Pub. No.: WO2016/077867
PCT Pub. Date: May 26, 2016

(65) Prior Publication Data
US 2017/0312695 A1    Nov. 2, 2017

(30) Foreign Application Priority Data

Nov. 19, 2014   (AU) .................... 2014904644

(51) Int. Cl.
*B01D 67/00*   (2006.01)
*B01D 61/02*   (2006.01)
(Continued)

(52) U.S. Cl.
CPC ....... *B01D 67/0048* (2013.01); *B01D 61/027* (2013.01); *B01D 67/0069* (2013.01);
(Continued)

(58) Field of Classification Search
None
See application file for complete search history.

(56) References Cited

U.S. PATENT DOCUMENTS 8,834,701 B2    9/2014  Shinde
2010/0323177 A1  12/2010  Ruoff et al.
(Continued)

FOREIGN PATENT DOCUMENTS

CN   103 625 085 A   3/2014
CN   103625085 A     3/2014
(Continued)

OTHER PUBLICATIONS

Dan B, Ph.D. Thesis from Rice University, Apr. 2011.*
(Continued)

*Primary Examiner* — Krishnan S Menon
(74) *Attorney, Agent, or Firm* — Knobbe, Martens, Olson & Bear, LLP

(57) ABSTRACT

An improved method for concentrating dispersions of graphene oxide, coating a substrate with a layer of a graphene oxide solution, and producing a supported graphene membrane stabilised by controlled deoxygenation; and graphene-based membranes that demonstrate ultra-fast water transport, precise molecular sieving of gas and solvated molecules, and which show great promise as novel separation platforms.

6 Claims, 23 Drawing Sheets

(51) Int. Cl.
*B82Y 30/00* (2011.01)
*B01D 71/02* (2006.01)
*C01B 32/192* (2017.01)
*C01B 32/23* (2017.01)
*B01D 69/10* (2006.01)
*C01B 32/198* (2017.01)
*C09K 19/52* (2006.01)
*B01D 71/40* (2006.01)
*B01D 71/38* (2006.01)
*B01D 69/14* (2006.01)

(52) U.S. Cl.
CPC ..... *B01D 67/0083* (2013.01); *B01D 67/0093* (2013.01); *B01D 69/10* (2013.01); *B01D 71/02* (2013.01); *B01D 71/021* (2013.01); *B01D 71/024* (2013.01); *B82Y 30/00* (2013.01); *C01B 32/192* (2017.08); *C01B 32/198* (2017.08); *C01B 32/23* (2017.08); *C09K 19/52* (2013.01); *B01D 67/0079* (2013.01); *B01D 69/148* (2013.01); *B01D 71/38* (2013.01); *B01D 71/40* (2013.01); *B01D 2323/06* (2013.01); *B01D 2323/10* (2013.01); *B01D 2323/30* (2013.01); *C09K 2019/521* (2013.01)

(56) References Cited

U.S. PATENT DOCUMENTS

| | | |
|---|---|---|
| 2013/0270188 A1 | 10/2013 | Karnik et al. |
| 2014/0061059 A1 | 3/2014 | Dryfe |
| 2014/0209168 A1 | 7/2014 | Zhamu |
| 2014/0311967 A1* | 10/2014 | Grossman ............ C01B 32/184 210/500.21 |
| 2014/0331920 A1 | 11/2014 | Chang |
| 2015/0038041 A1* | 2/2015 | Zhamu ............... D03D 15/0088 442/195 |

FOREIGN PATENT DOCUMENTS

| | | |
|---|---|---|
| WO | WO 2008/143829 A2 | 11/2008 |
| WO | WO 2012/120264 A1 | 9/2012 |
| WO | WO 2013/040636 A1 | 3/2013 |
| WO | WO 2014/027197 A1 | 2/2014 |
| WO | WO 2012/120264 A9 | 4/2014 |
| WO | WO 2014/191765 A1 | 12/2014 |

OTHER PUBLICATIONS

European Search Report, dated May 7, 2018, in European Patent Application No. 15861139.2.
Tkacz, R., et al., Capillary-Force-Assisted Self Assembly (CAS) of Highly Ordered and Anisotropic Graphene-Based Thin Films, The Journal of Physical Chemistry, vol. 118, pp. 259-267, 2014.
International Search Report & Written Opinion, dated Mar. 7, 2016, in International Application No. PCT/AU2015/000698.
Abdelkader, A.M., et al., How to get between the sheets: a review of recent works on the electrochemical exfoliation of graphene materials from bulk graphite, Nanoscale vol. 7, pp. 6944-6956, 2015.
International Search Report & Written Opinion, dated Dec. 7, 2016, in International Application No. PCT/AU2016/051002.
Kang, F., et al., Influences of $H_2O_2$ on synthesis of $H_2SO_4$—GICs, Journal of Physics and Chemistry of Solids, vol. 57, Nos. 6-8, pp. 889-892, 1996.
Liu, J., et al., Electrochemically exfoliated graphene for electrode films: effect of graphene flake thickness on the sheet resistance and capacitive properties, Langmuir, vol. 29, pp. 13307-13314, 2013.
Mahato, N., et al., Graphene nanodiscs from electrochemical assisted micromechanical exfoliation of graphite: Morphology and supramolecular behavior, Materials Express, vol. 5, No. 6, pp. 471-479, 2015.
Munuera, J.M., et al., High quality, low oxygen content and biocompatible graphene nanosheets obtained by anodic exfoliation of different graphene types, Carbon, vol. 94, pp. 729-739, 2015.
Parvez, K., et al., Exfoliation of graphite into graphene in aqueous solutions of inorganic salts, Journal of the American Chemical Society, vol. 136, pp. 6083-6091, 2014.
Paton, K.R., et al., Scalable production of large quantities of defect-free few-layer graphene by shear exfoliation in liquids, Nature Materials, vol. 13, pp. 624-630, 2014.
Shinde, D., et al., Shear assisted electrochemical exfoliation of graphite to graphene, Abstract, RPGR 2015, 7th International Conference on Recent Progress in Graphene Research, Retrieved on Mar. 23, 2016, Equivalent to Shinde, D.B., et al., Shear assisted electrochemical exfoliation of graphite to graphene, Langmuir, vol. 32, pp. 3552-3559, 2016.
Shinde, D.B., et al., Shear assisted electrochemical exfoliation of graphite to graphene, Langmuir, vol. 32, pp. 3552-3559, 2016.
Su, C.-Y., et al., High-quality thin graphene films from fast electrochemical exfoliation, ACS Nano, vol. 5, No. 3, pp. 2332-2339, 2011.
Xia, Z.Y., et al., The exfoliation of graphene in liquids by electrochemical, chemical, and sonication-assisted techniques: a nanoscale study, Advanced Functional Materials, vol. 23, pp. 4684-4693, 2013.
Yang, S., et al., Organic radical-assisted electrochemical exfoliation for the scalable production of high-quality graphene, Journal of the American Chemical Society, vol. 137, pp. 13927-13932, 2015.
Akbari, A., et al., Large-Area Graphene-Based Nanofiltration Membranes by Shear Alignment of Discotic Nematic Liquid Crystals of Graphene Oxide, Nature Communication, 7:10891 | DOI: 10.1038/ncomms10891, 2016.

* cited by examiner (1)

(2)

(3)

GRAPHENE OXIDE MEMBRANES AND METHODS RELATED THERETO

PRIORITY AND CROSS-REFERENCE TO RELATED APPLICATIONS

This application is the U.S. National Phase Application under 35 U.S.C. § 371 of International Application No. PCT/AU2015/000698, filed Nov. 19, 2015, designating the U.S. and published as WO 2016/077867 A1 on May 26, 2016, which claims the benefit of Australian Application No. AU 2014904644, filed Nov. 19, 2014. Any and all applications for which a foreign or a domestic priority is claimed is/are identified in the Application Data Sheet filed herewith and is/are hereby incorporated by reference in their entirety under 37 C.F.R. § 1.57.

FIELD OF THE INVENTION

The invention is directed towards graphene oxide membranes, as well as methods for producing graphene oxide membranes and precursors thereof.

BACKGROUND OF THE INVENTION

Advances in the design and synthesis of nanofiltration (NF) membranes with improved retention, flux and cost-effectiveness is expected to have tremendous impact in several fields such as water treatment, selective chemical separations and drug delivery. Conventional polymeric NF membranes usually have limited chemical resistance, while ceramic membranes are not cost-efficient.

Graphene based films have been found to have excellent filtration properties which make them well suited for use in a variety of industries and applications, such as water purification, chemical synthesis, pharmaceutical purification, and many other separation processes.

Graphene is a one atom thick 2D honeycomb sp2 carbon lattice, which is an exciting multifunctional material that possesses a combination of strong mechanical properties, chemical inertness, and has an extremely large surface area.

Membranes prepared from graphene are chemically inert like ceramic membranes and can be made into films using graphene/graphene-oxide (GO) fluid phase dispersions like polymers. Graphene-based membranes also have high permeability and high selectivity for both liquids and gases.

Although graphene-based membranes have a host of potential applications, one problem with the use of graphene based films is that they are expensive and time consuming to fabricate. Graphene based thin films have been fabricated via a variety of methods, including vacuum filtration and chemical vapour deposition.

Given the above, there is a need for improved processes to produce large sized membranes using high throughput manufacturing routes which may otherwise hinder the use of graphene based membrane technologies.

The ideal filtration membrane is a defect-free, thin, dense separation film which acts as a functional sieve, with mechanical strength being provided by a porous and more permeable support.

To achieve this asymmetric structure, researchers have grown continuous graphene films by chemical vapour deposition and transferred them to substrates followed by etching pores on the film. However, the transfer process limits the scalability of membrane production. For example, US 2013/0270188 disclose permeable graphene membranes formed by growth of graphene over catalytic substrates such as Cu and Ni by chemical vapour deposition and subsequent transfer over a porous substrate. The pores are then generated by the application of focussed ion beam to ablate permeable pores. The process requires high temperature for formation of graphene and the transfer process may limit the scalability of the technique.

Another method to produce this structure is by re-staking GO flakes by filtration of GO dispersions on a backing filter support. However, producing a membrane using this method requires large volumes of liquid and significant processing time. Furthermore, membranes formed using this method generally have both alignment (of the GO sheets) and scalability issues. For example, US 2010/0323177 A1 by Rohit et al. and WO 2008143829 A2 by Dikin et al. discloses the formation of filtration films from very dilute (~1-10 µg/ml) liquid phase stabilized graphene oxide or reduced graphene oxide in which the graphene oxide or reduced graphene oxide membrane is formed by filtration over a porous substrate, where the sediment forms the permeable membrane. However, this process is time consuming, requires an extremely large volume of liquid, and lacks process control regarding homogeneity, compaction and molecular order, which adversely affects the performance of the membranes.

Other liquid phase processes such as dip-coating or layer-by-layer assembly similarly have potential issues with rapid productivity.

Given the above, a major challenge in this field is to provide a robust, scalable, liquid film processing approach to produce large-area graphene-based membranes.

It is an object of the invention to address at least one of the above mentioned short-comings of the prior art.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

SUMMARY OF THE INVENTION

In one aspect of the invention, there is provided a method for concentrating a stabilized solution of graphene oxide including a continuous phase and having an initial graphene oxide concentration, the method including: adding an absorbent material to the solution; and absorbing at least a portion of the continuous phase from the solution with the absorbent material to form a concentrated solution having a graphene oxide concentration that is greater than the initial graphene oxide concentration.

Preferably, the method further includes the step of separating the absorbent material and the solution after the absorbing step.

Advantageously, this method can be used to concentrate solutions of graphene oxide without the application of heat or vacuum. In various embodiments, the method also results in converting a dilute suspension of graphene oxide into a viscoelastic, liquid crystalline fluid, such as a concentrated solution of discotic nematic phase graphene oxide.

Graphene oxide liquid crystals may be produced and/or stored in a range of different liquid phases. The skilled addressee will appreciate that a range of different solvents or liquids may be used and that the selection of an appropriate absorbent will depend on the particular continuous phase that is used. Suitable solvents include alcohols, DMF, and acetone. The skilled addressee will appreciate the selection of an appropriate absorbent material to absorb the specific solvent that has been chosen. However, it is preferred that the continuous phase is water, and that the absorbent material is a water absorbent material. More preferably, the absorbent material is a hydrogel material. Even more preferably, the hydrogel material is in the form of hydrogel beads, and the step of adding the absorbent material includes adding a plurality of hydrogel beads.

Hydrogel beads are preferred as they are able to absorb and retain large quantities of water compared with their volume. Typically hydrogel beads, on absorption of water, can swell to around 500 times its weight (from 10 to 60 times its own volume). This allows a large volume of water to be removed through the addition of a relatively small volume of hydrogel beads. Furthermore, the hydrogel beads are strongly hydrophilic and therefore readily absorb water while excluding graphene and/or graphene oxide which is generally hydrophobic in nature.

The hydrogel beads may be added in a number of ways. The hydrogel beads may be added simultaneously, may be added over a period of time, or may be added in batches where the first batch is removed prior to the addition of the second batch. It is preferred that the hydrogel beads are added over a period of time, whether batch wise or not, as this provides greater control over the absorption of water from the graphene and/or graphene oxide solution. Conveniently, after removal, the hydrogel beads can be dried to remove the absorbed water, and then reused.

Typically, the hydrogel beads are formed from superabsorbent polymers. Such superabsorbent polymers are commonly made from the polymerization of acrylic acid blended with sodium hydroxide in the presence of an initiator to form a poly-acrylic acid sodium salt (sometimes referred to as sodium polyacrylate). This polymer is the most common type of superabsorbent polymer that is produced globally. The skilled addressee will appreciate that other superabsorbent polymers may also be chosen based on having the desired absorption characteristics. Other materials that could be used to make superabsorbent polymers are: polyacrylamide copolymer, ethylene maleic anhydride copolymer, cross-linked carboxymethylcellulose, polyvinyl alcohol copolymers, cross-linked polyethylene oxide, and starch grafted copolymer of polyacrylonitrile to name a few.

Typically the initial concentration of the graphene oxide is around 1 µg/L. It is preferred that the graphene oxide solution is concentrated to greater than 15 mg/mL; more preferably, at least 20 mg/mL; even more preferably, at least 30 mg/mL; and most preferably, at least 40-60 mg/mL.

The absorption step is dependent on the initial concentration of the graphene and/or graphene oxide in solution and the final desired concentration, as well as the chosen absorption strategy. However, typically the absorbing step is conducted for a time of up to 1 hour. More preferably, the absorption step is conducted for a time of less than 1 hour. Even more preferably, the absorption step is conducted from a time of less than 30 minutes. However, as discussed above, the skilled addressee will appreciate that this depends in part on the type of water-absorbent that is selected and the solution concentration which is desired.

In another aspect of the invention there is provided a method of forming a film of a stabilised solution of graphene oxide on a substrate surface, the method including: applying an amount of the solution of graphene oxide to the substrate surface; drawing the solution through a channel defined by two opposing surfaces having a gap therebetween at a shear rate, wherein a first opposing surface of the channel is the substrate surface; and forming a film of the solution having a thickness corresponding to a length of the gap.

Preferably the solution is a solution of discotic nematic phase graphene oxide. That is, it is preferred that the graphene oxide is substantially all discotic nematic graphene oxide. More preferably, the step of drawing the solution through the channel applies a shear stress that shear aligns the graphene oxide.

In one or more embodiments, the shear rate generates a shear stress of about 0.0005 to about 0.05 Pa·s; preferably, the shear stress is about 0.001 to about 0.04 Pa·s; more preferably, about 0.0016 to about 0.03 Pa·s.

In one or more embodiments, an imposed stress is applied to the solution between the two opposing surfaces; preferably this stress is at least 50 Pa; more preferably at least 65 Pa; and most preferably, at least 80 Pa.

In one or more embodiments, the process excludes the wicking of graphene oxide particles into the porous substrate because of the high viscous forces thereby creating an electrically isolated thin film of graphene oxide from the porous substrate beneath.

In one or more embodiments, the method can be applied to make a large area membrane. This is because the volume of fluid required is small and as such a roll-to-roll manufacturing process may be adopted.

Preferably, the step of drawing the solution through the channel includes moving the two opposing surfaces relative to one another.

In an embodiment, a concentration of the solution of graphene oxide is greater than 15 mg/mL; preferably, at least 20 mg/mL; more preferably, at least 30 mg/mL; even more preferably, at least 40 mg/mL; and most preferably at least 60 mg/mL.

Preferably the imposed stress is relative to the concentration of the solution of graphene oxide. For example; for a concentration of at least 15 mg/mL it is preferred that the imposed stress is at least 50 Pa, more preferably at least 60 Pa; for a concentration of at least 20 mg/mL it is preferred that the imposed stress is at least 70 Pa, more preferably at least 80 Pa; for a concentration of at least 40 mg/mL, it is preferred that the imposed stress is at least 140 Pa, more preferably at least 160 Pa; and for a concentration of at least 60 mg/mL, it is preferred that the imposed stress is at least 250 Pa, more preferably at least 300 Pa.

In an embodiment, the step of drawing the solution through the channel applies a shear rate of from about 10 to about 200,000 per second. Preferably the shear rate is from about 1000 to about 10,000 per second.

In an embodiment, the step of drawing the solution through the channel applies a shear rate of at least 10 per second; more preferably, of at least 100 per second; even more preferably, of at least 1000 per second; and most preferably, of at least 5000 per second.

In an embodiment, a second opposing surface is an applicator surface of a coating apparatus selected from the group consisting of: a rod coater, a roll coater, a knife coater, a flexible applicator, a curtain coater, and a gravure coater.

A wide variety of substrates may be chosen. However, where the intended application of the graphene oxide film is for use in filtration, it is preferred that the substrate is a porous substrate. Preferably, the porous substrate is selected from the group consisting of polymers, metals, and ceramics.

Preferably the substrate has pore sizes in the range of from about 20 nm to about 1000 nm.

In an embodiment the method further includes treating the film to remove at least some functional groups, such as carboxyl, hydroxyl, or epoxy groups that are present on the film to form a reduced graphene oxide film.

Preferably, the step of treating the film includes chemical treatment with a reducing agent. More preferably, the reducing agent is a compound selected from the group consisting of: hydrazine, sodium borohydrate, citrates, NaOH, KOH, or a combination thereof. In addition, or in the alternate, the step of treating the film includes physical treatment with plasma, ion-beams, heat, UV light, or a combination thereof.

In another aspect of the invention there is provided a graphene oxide film or reduced graphene oxide film formed according to the method previously described. Preferably the graphene oxide film or the reduced graphene oxide film is a membrane.

Preferably the graphene oxide film is substantially free of defects such as pinholes.

In yet another aspect of the invention there is provided a method of forming a reduced graphene oxide film including: treating a graphene membrane as substantially described above or formed by a method as substantially described above to remove chemical moieties from the graphene oxide membrane to form a reduced-graphene oxide membrane.

Preferably, the step of treating the film includes exposing the film to a reducing agent. More preferably, the reducing agent is a compound selected from the group consisting of: hydrazine, sodium borohydrate, citrates, NaOH, KOH, or a combination thereof. In addition, or in the alternate, the step of treating the film includes exposing the film to physical treatment with a treatment process selected from the group consisting of plasma, ion-beams, heat, UV light, or a combination thereof.

It is preferred that the treatment process removes chemical moieties selected from the group consisting of carboxyl groups, hydroxyl groups, and/or epoxy groups.

In yet another aspect of the invention, there is provided the use of the reduced-graphene oxide film, as described above, as a membrane in a membrane separation process.

In one or more embodiments, membranes formed according to the method of the invention can be used for selective transport of ions such as but not limited to NaCl, KCl, $CaCl_2$, $MgCl_2$, families of cyanide complexes of Fe, Au, Cu, salts of heavy metals such as Hg, Pb, As, Cd, Cu etc.

In one or more embodiments, the membrane is an asymmetric membrane. The asymmetric membrane can be utilized in pressurized flow cells up to a pressure of 10-15 bar using liquids such as but not limited to water, ethanol, methanol, butanol, hexane, and toluene.

In one or more embodiments, the asymmetric membrane can be utilized for separation of small molecules with molecular weight in the range of 200-800 Da.

In one or more embodiments, an electric field can be applied on the graphene membranes to affect permeability of ions, small molecules or to regenerate the membrane after fouling. The electric field is applied by using the membrane as a working electrode in a two-/three-electrode configuration, while the membrane is also functioning as a filtration membrane.

In still another aspect of the invention there is provided a graphene oxide membrane including a graphene oxide layer on a support layer, the graphene oxide layer including aligned discotic graphene oxide particles.

Further aspects of the present invention and further embodiments of the aspects described in the preceding paragraphs will become apparent from the following description, given by way of example and with reference to the accompanying drawings.

BRIEF DESCRIPTION OF THE DRAWINGS

FIGS. 7(a), (b), (c), and (d) illustrates an experimental setup in accordance with an embodiment of the invention that was used to form a membrane of concentrated graphene oxide solution, and the resulting graphene membrane.

Schematics (c) and (f) are the predicted organization of graphene sheets in membranes.

Figure 16:
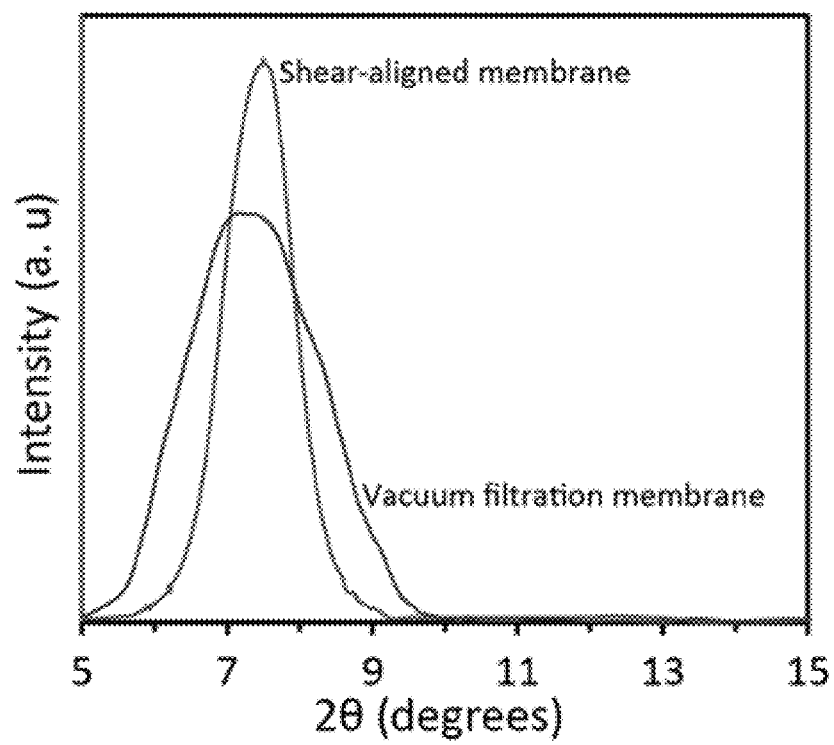

FIG. 16: XRD patterns of SAM and vacuum filtration membranes demonstrate highly ordered lamellar structure for SAM.

Figure 17:
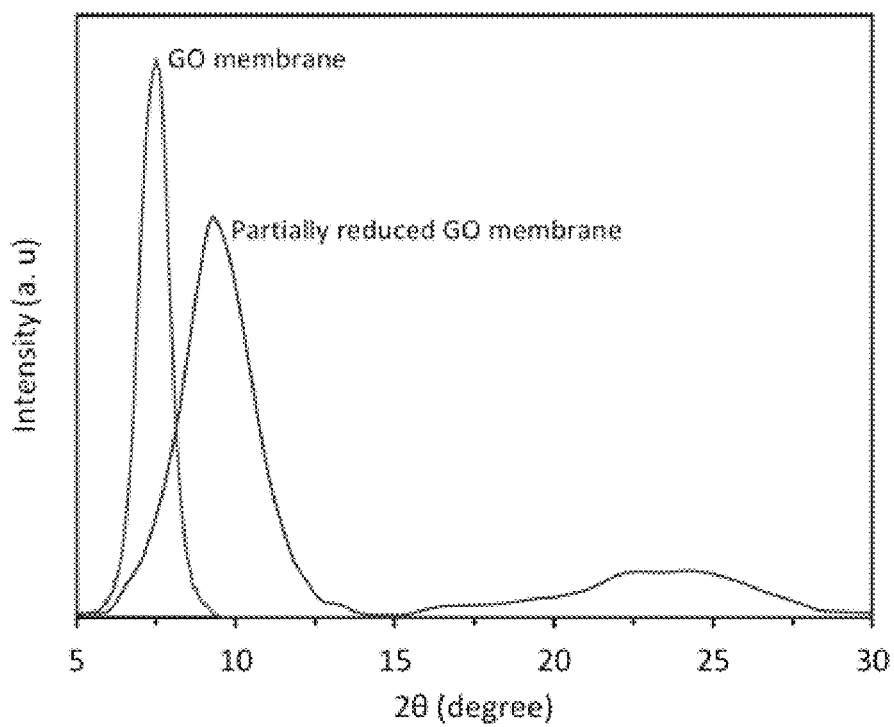

FIG. 17: XRD pattern of the SAM of GO and SAM after partially reduction in hydrazine vapour.

Figure 18:
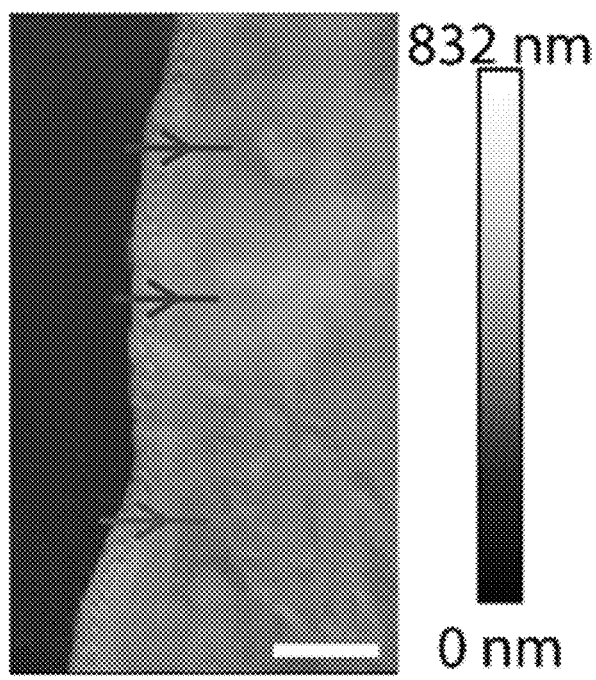

FIG. 18: Height profiles of SAM; scale bar is 1 μm.

Figure 19:
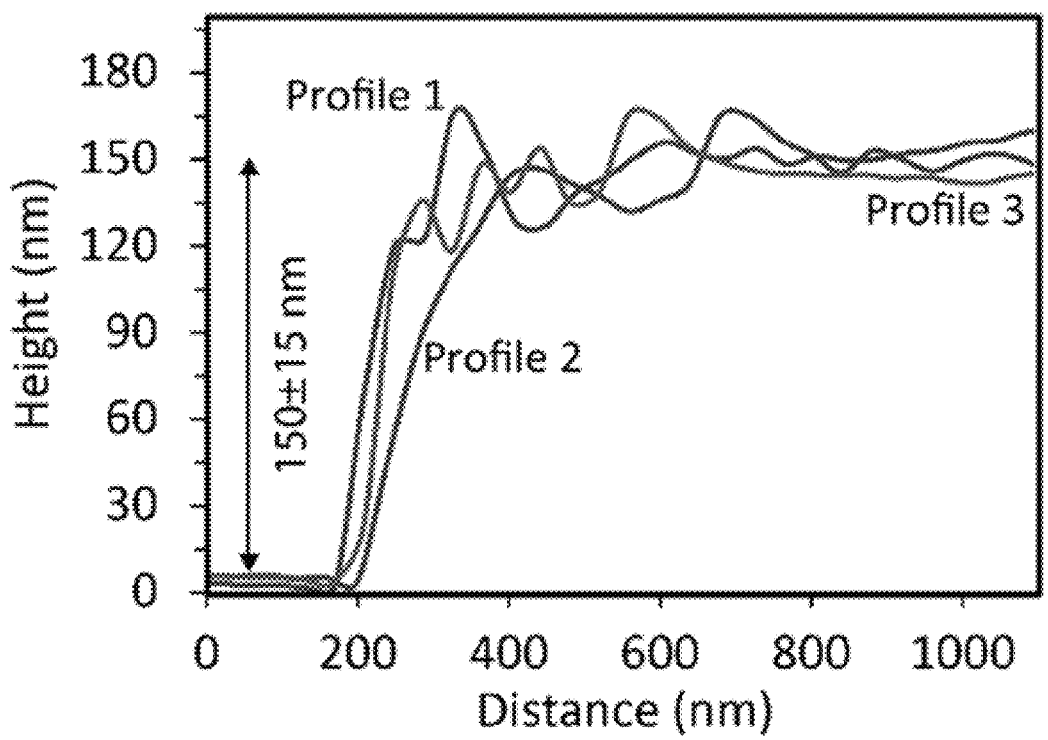

FIG. 19: Graph showing height profile of SAM.

Figure 20:
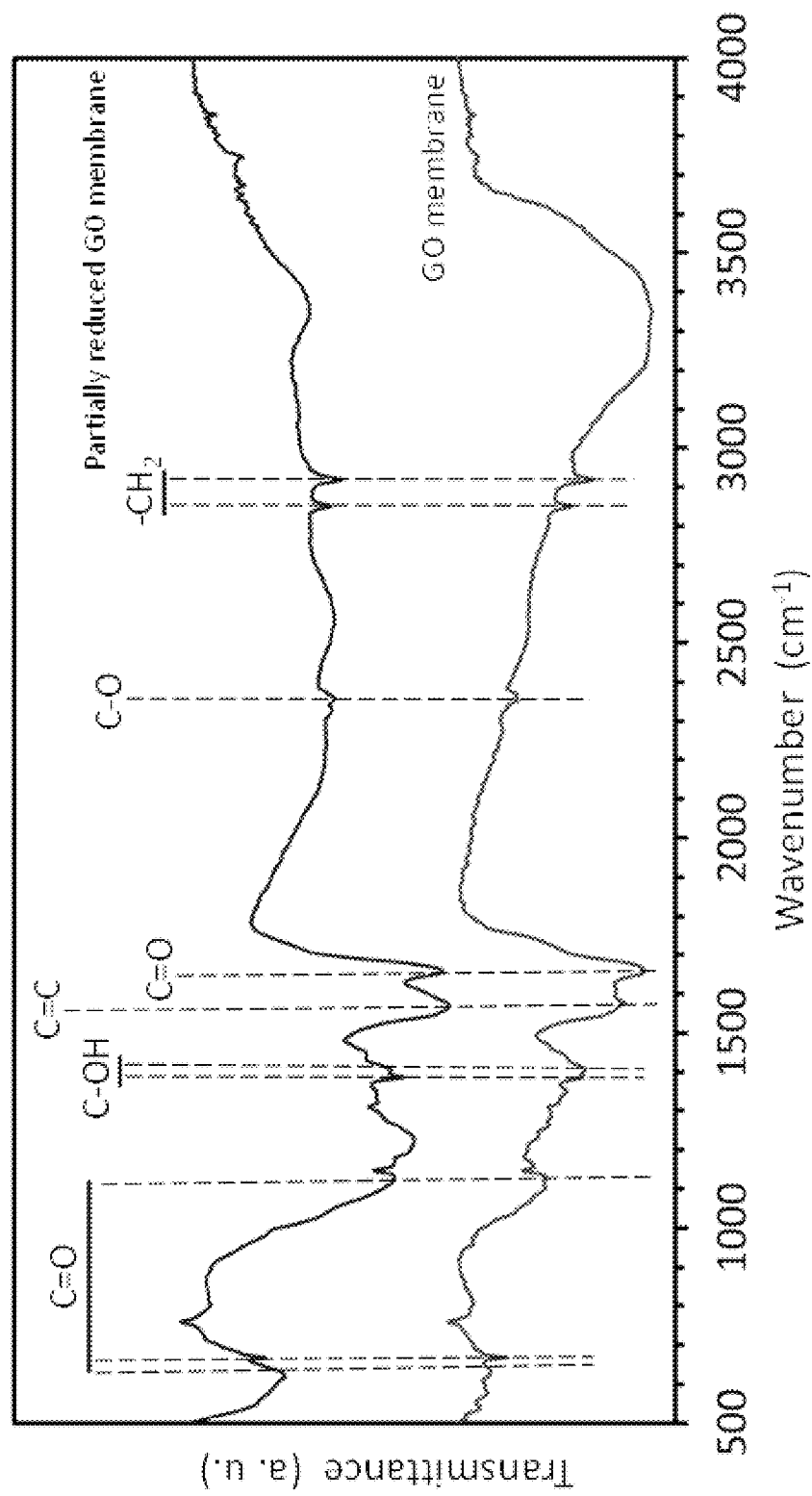

FIG. 20: FTIR spectra of SAM of GO and SAM after partial reduction in hydrazine vapour.

Figure 21:
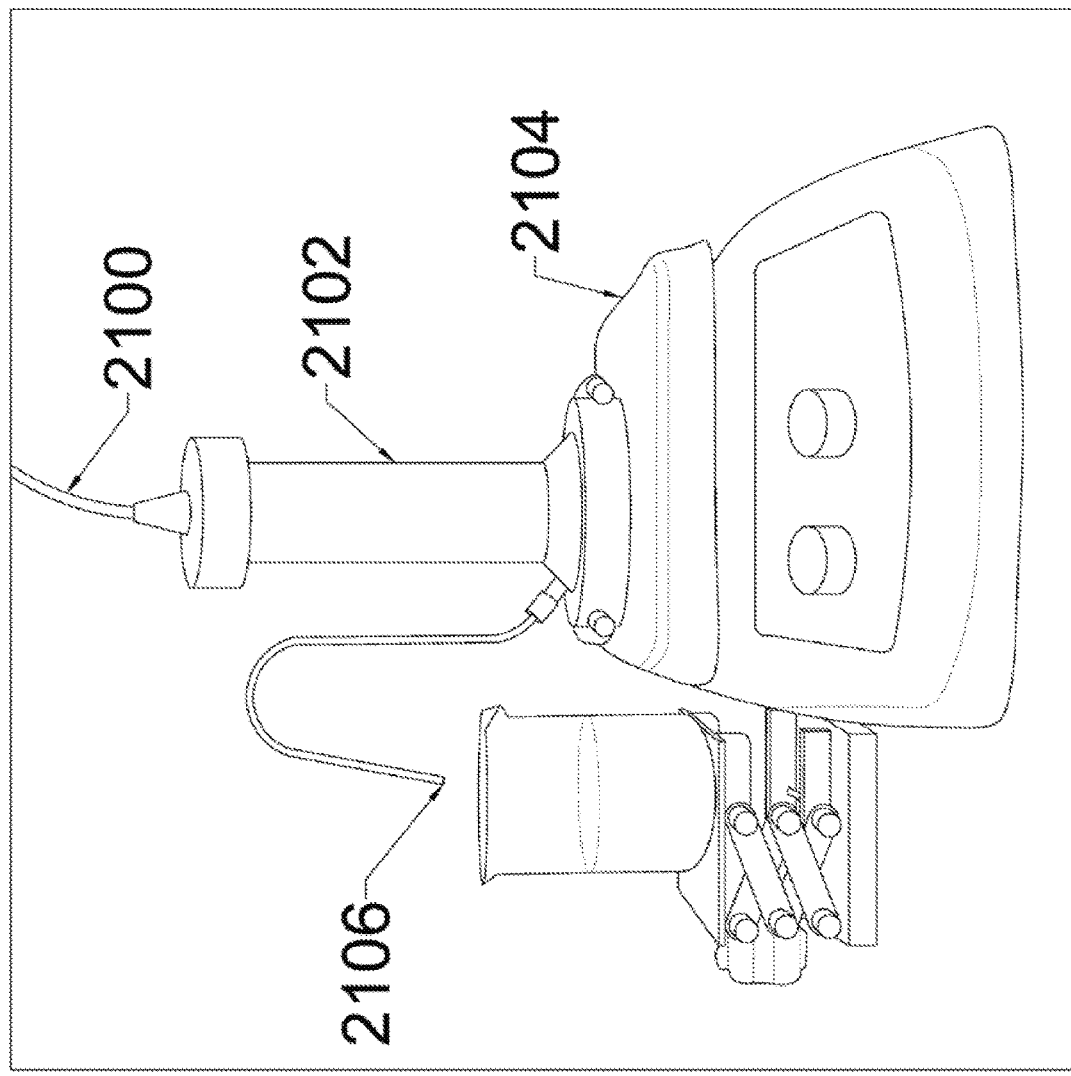

FIG. 21: Membrane testing equipment. A dead-end filtration cell (Sterlitech HP4750 with high pressure stirred cell) pressurized by nitrogen gas was used to examine the performance of the membranes.

Figure 22:
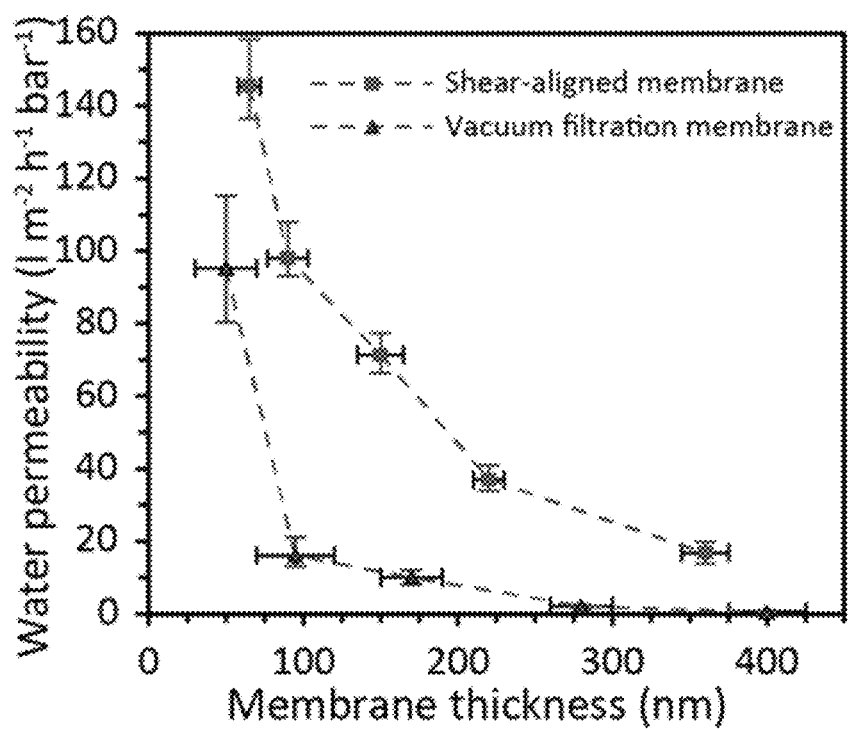

FIG. 22: Graph showing comparison of water permeability using SAM and vacuum filtration membrane. Error bars are from five measurements showing the maximum and minimum values.

Figure 23:
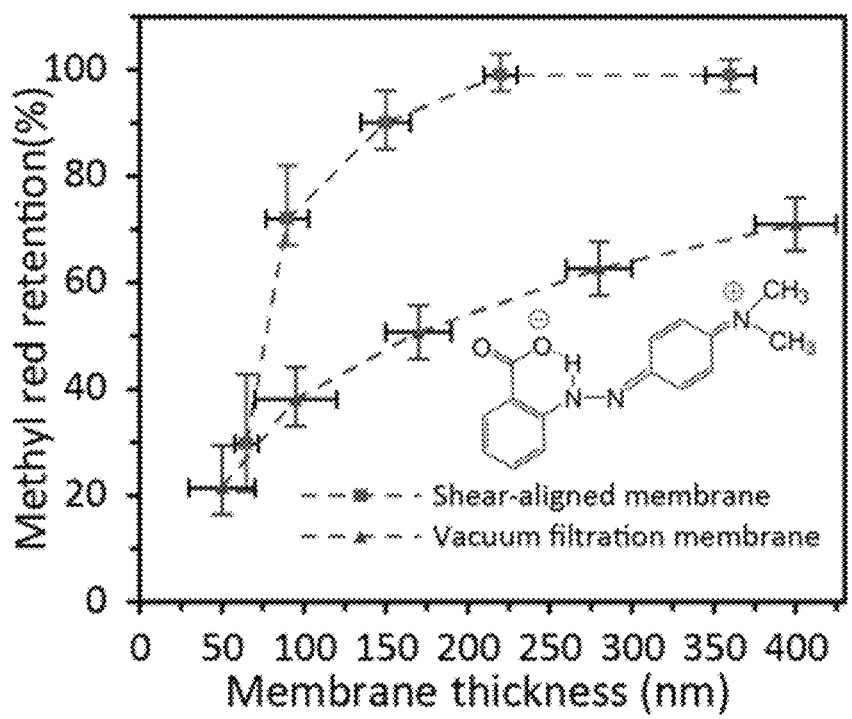

FIG. 23: Graph showing comparison of retention of methyl red, an electroneutral probe molecule, using SAM and vacuum filtration membrane. Inset image is the structure of the electroneutral probe molecule. Error bars are from five measurements showing the maximum and minimum values.

Figure 24:
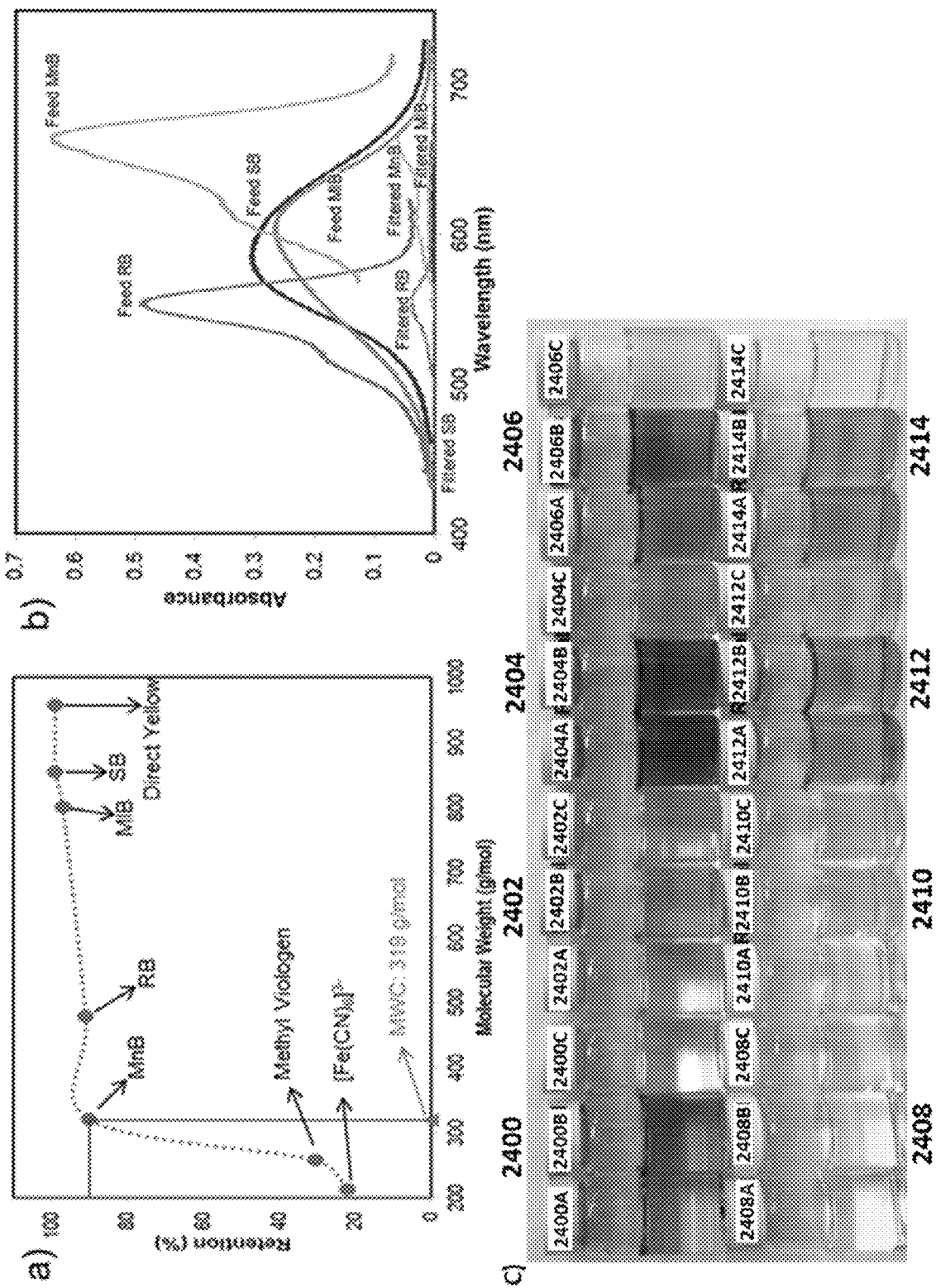

FIG. 24: Results of exclusion testing of a membrane formed according to an embodiment of the invention.

Figure 25:
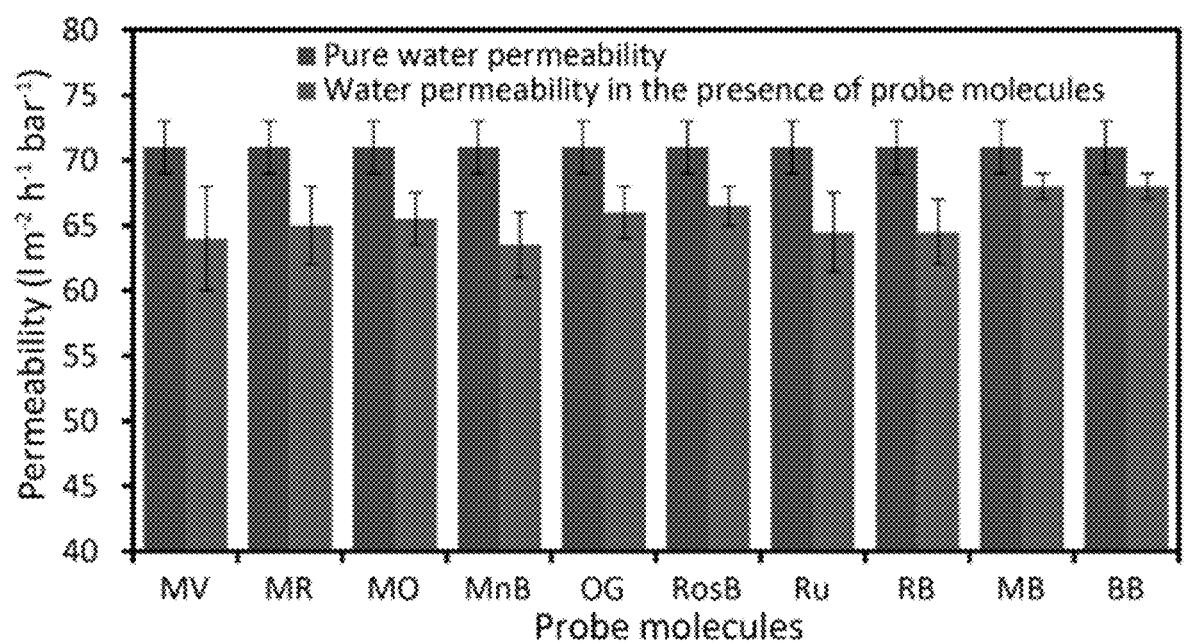

FIG. 25: Graph of pure water permeability and water permeability in the presence of probe molecules. Permeability declined during rejection tests with probe molecules. The results show that a maximum of 10% decline is observed, it is larger for small molecules (methyl viologen ~10% reduction), and less for bigger probe molecules (~4.2% for methyl blue and brilliant blue) consistent with minimal sorption effects. Error bars are from five measurements showing the maximum and minimum values.

Figure 26:
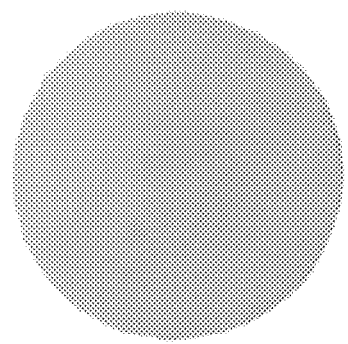
Figure 26:
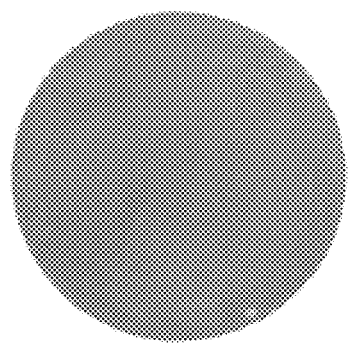
Figure 26:
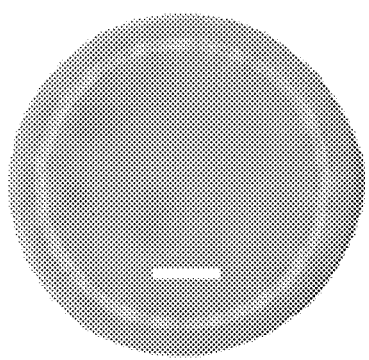

FIG. 26: Photographs of the membrane before (1) and after filtration (2) of methyl red, and after the cleaning process (3) which shows regeneration of the parent-membrane surface; scale bare is 1 cm.

Figure 27:
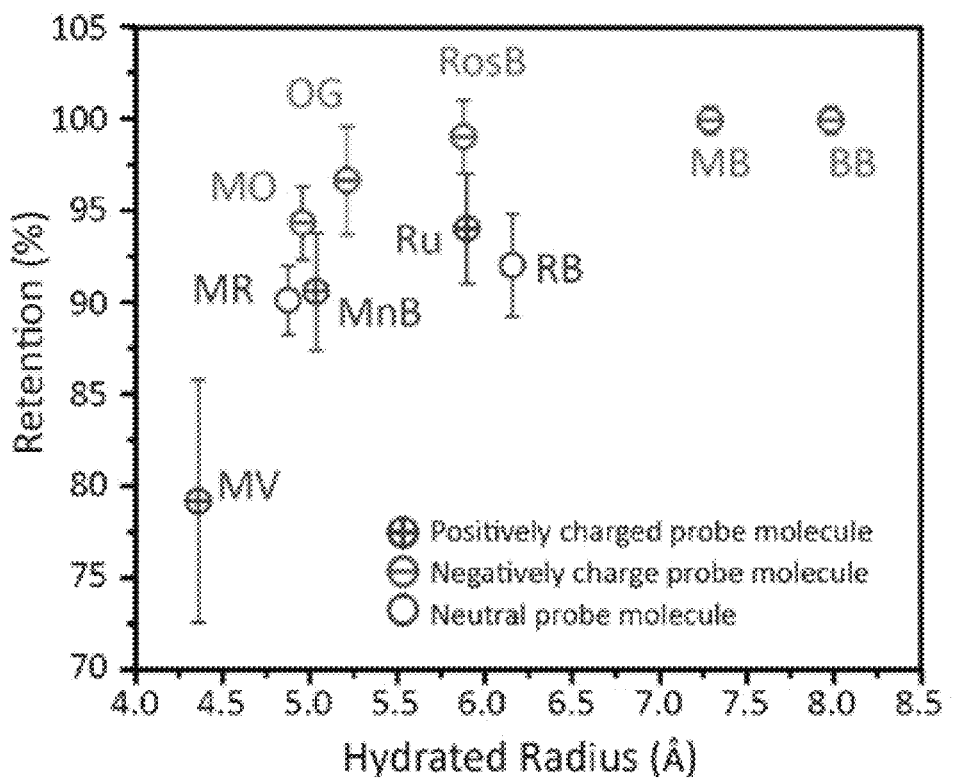

FIG. 27: Graph showing retention performance of a 150±15 nm thick shear-aligned membrane under 0.5 bar nitrogen pressure, as a function of hydrated radius, for probe molecules with different charges and sizes. (MV is methyl viologen, MR is methyl red, MnB is methylene blue, MO is methyl orange, OG is orange G, Ru is Tris (bipyridine) ruthenium (II) chloride, RB is Rhodamine B, RosB is Rose Bengal, MB is methylene blue, BB is brilliant blue. The green, red and blue symbols represent electroneutral, negatively and positively charged probe molecules, respectively. The membrane retained at least 90% of all molecules which had a radius of more than 5 Å. Hydrated radii are estimated from the Connolly Accessible Area of the probe molecules FIG. 28: Graph showing retention details of the membrane for the probe molecules. Error bars are from five measurements showing the maximum and minimum values.

Figure 29:
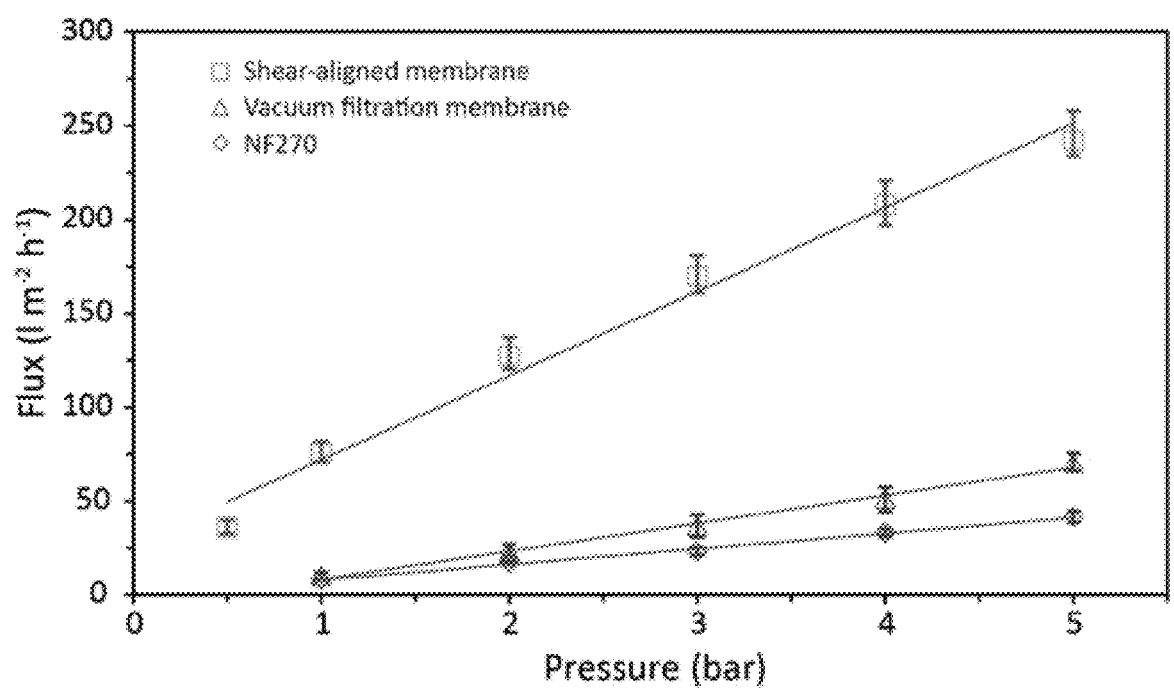

FIG. 29: Graph showing water flux versus applied pressure for three different membranes: SAM (red) with a thickness of 150±15 nm, vacuum filtration (blue) with a thickness of 170±20 nm, and NF270, a commercial nanofiltration membrane (green). Error bars are from five measurements showing the maximum and minimum values.

Figure 30:
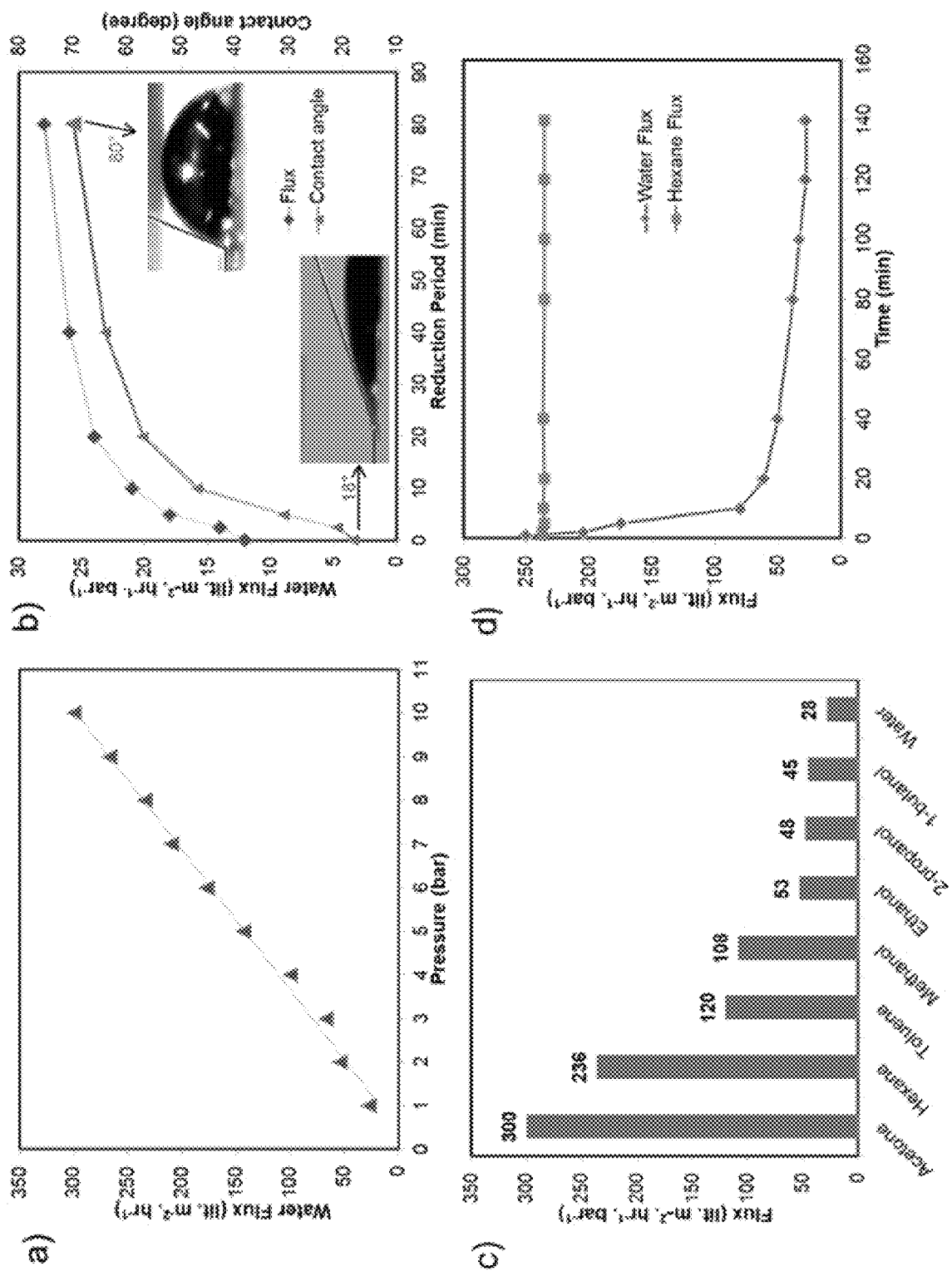

FIG. 30: The results of permeability tests conducted on a membrane formed according to an embodiment of the invention.

Figure 31:
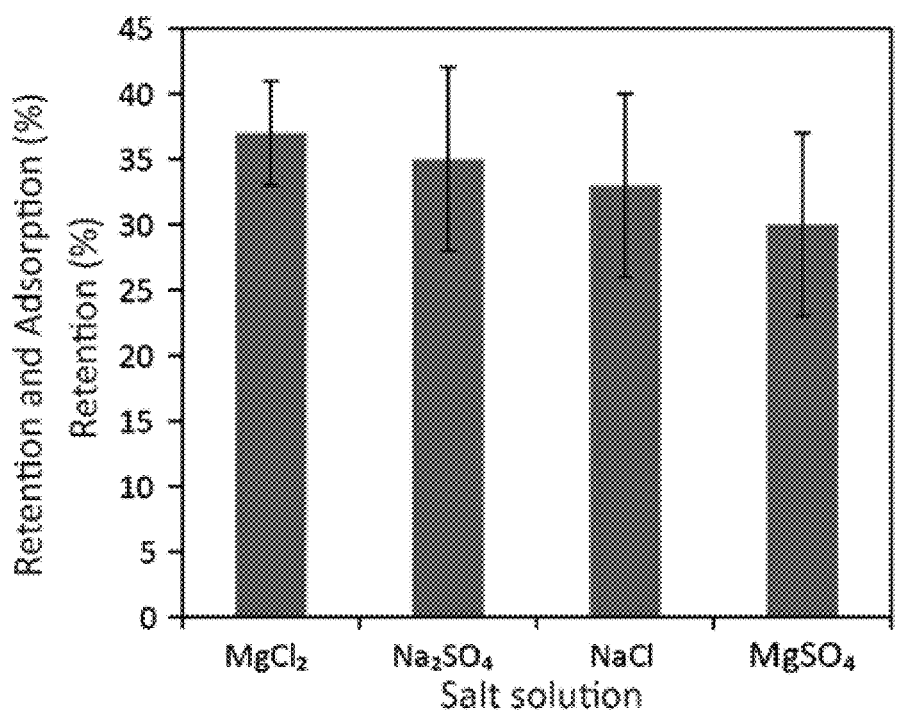

FIG. 31: Graph showing salt retention by the 150±15 nm thick SAM under 0.5 bar nitrogen pressure, for four different salt solutions. Error bars are from five measurements showing the maximum and minimum values.

Figure 32:
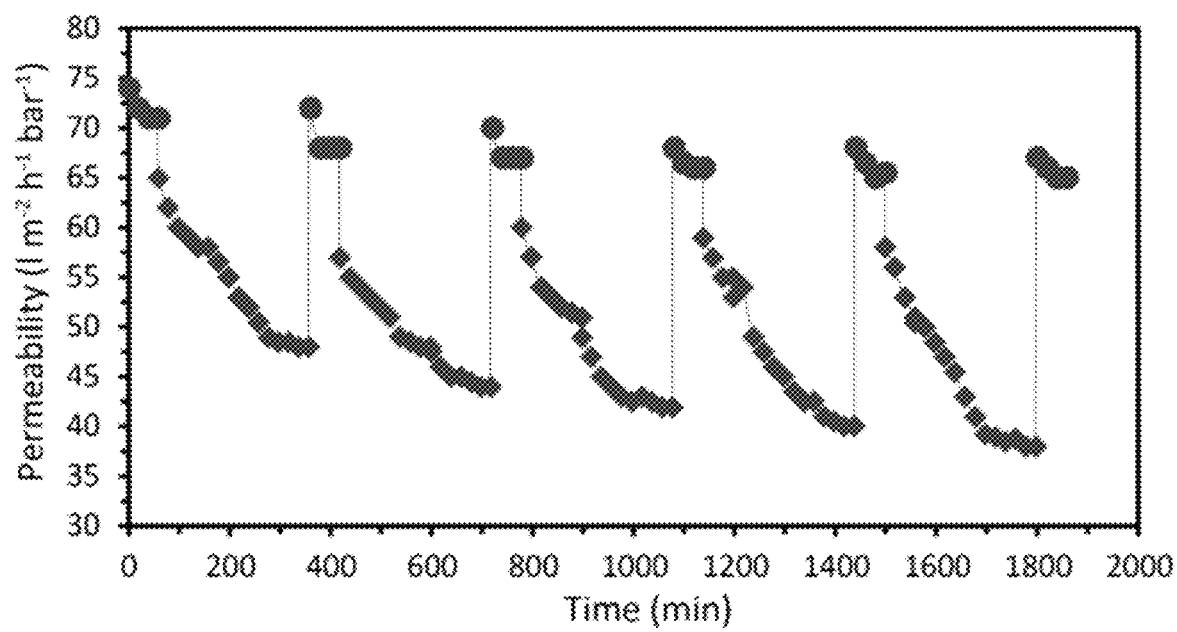

FIG. 32: Demonstration of long-term viability, low fouling behaviour of the membranes during filtration of BSA and flux recovery after chemical cleaning.

DETAILED DESCRIPTION OF THE EMBODIMENTS

The inventors have developed an improved method for concentrating dispersions of graphene oxide, coating a substrate with a layer of a graphene oxide solution, and producing a supported graphene membrane stabilised by controlled deoxygenation.

The inventors have also developed graphene-based membranes that demonstrate ultra-fast water transport, precise molecular sieving of gas and solvated molecules, and which show great promise as novel separation platforms.

The inventors have found that the discotic nematic phase of graphene oxide (GO) can be shear aligned to form highly ordered, continuous, thin films of multi-layered GO on a support membrane by an industrially-adaptable, rapid and scalable process to produce large-area membranes. Such as thin, uniform and continuous graphene-based membranes supported on porous substrates. For example, the inventive process has been used to form membranes having an area of 13×14 cm$^2$ in less than 5 seconds.

The shear-alignment process introduces large in-plane order and stacking periodicity in the graphene-based films. This structural order is found to enhance water flux dramatically while facilitating retention of organic molecules and ions by molecular sieving and electrostatic repulsion. Thus, using the methods disclosed herein, the inventors have been able to form substantially defect-free, large-area asymmetric GO membranes by taking advantage of the discotic nematic phase of GO by a shear-induced, industrially-adaptable liquid thin film process referred to herein as a shear-aligned membrane (SAM).

Pressure driven transport data demonstrates high retention (>90%) for charged and uncharged organic probe molecules with a hydrated radius above 5 Å as well as modest (30-40%) retention of monovalent and divalent salts. The highly ordered graphene sheets in the plane of the membrane make organized channels and enhance the permeability, for example up to 71±5 l m$^{-2}$ hr$^{-1}$ bar$^{-1}$ for 150±15 nm thick membranes.

The large-area graphene-based membranes produced by shear alignment have higher flux than commercially available Dow Filmtec NF270 membranes and excellent flux recovery by simple solvent cleaning. These large-area graphene-based membranes are ideal candidates for highly desirable low-pressure, low-fouling, membrane-based nanofiltration separation processes.

In an embodiment, there is provided a method for concentrating an aqueous solution of stabilised graphene oxide. The initial solution of graphene oxide may be prepared according to those methods already known in the art, such as by Hummers method. Oxidation and exfoliation of graphite by the Hummer's method or its variations produces graphene nanosheets decorated with oxygenated functional groups also known as graphene oxide (GO). The anisotropic GO nanosheets can be dispersed in liquids including water as stable colloidal suspensions with large volume-fractions.

To concentrate the graphene oxide solution, the method of the invention includes adding a plurality of hydrogel beads to the solution. The hydrogel beads absorb the water from the solution without absorbing the stabilised graphene oxide.

This results in a concentrated solution of stabilised graphene oxide. This process converts the suspension into a viscoelastic, liquid crystalline fluid. The resultant fluid can flow easily under imposed shear, electrical, and magnetic forces.

This process is typically quicker and less energy consuming than traditional approaches to concentrating stabilised graphene oxide such as through the application of heat, or the use of vacuum equipment. The time taken to concentrate the sample depends on the initial concentration and the final desired concentration. However, using the method of the invention, it takes around an hour to concentrate a solution from an initial concentration of about 0.25 mg/mL to a desired concentration of about 20 mg/mL.

All of the hydrogel beads may be added simultaneously, or the addition of the hydrogel beads may occur over a period of time. Each hydrogel bead may also be added sequentially. The hydrogel beads may be added to the graphene oxide solution in a batch manner or a semi-batch manner. Alternatively, the graphene oxide solution may contact the hydrogel beads in a continuous stirred tank reactor or plug flow reactor CSTR or PFR type process. The graphene oxide solution may be caused to flow through a reactor having hydrogel beads suspended or retained therein, with the concentrated graphene oxide solution exiting the reactor at an outlet. In one example, to produce 10 ml of 20 mg/ml graphene oxide suspension an initial solution of 800 ml with a graphene oxide concentration of 0.25 mg/mL was provided. Hydrogel beads were added to the solution. These beads swell as they absorb water from the solution. The beads typically swell to about 10-60 times their original diameter, such as from a dry diameter of 2 mm to a final swollen diameter of around 20 mm.

Figure 1:
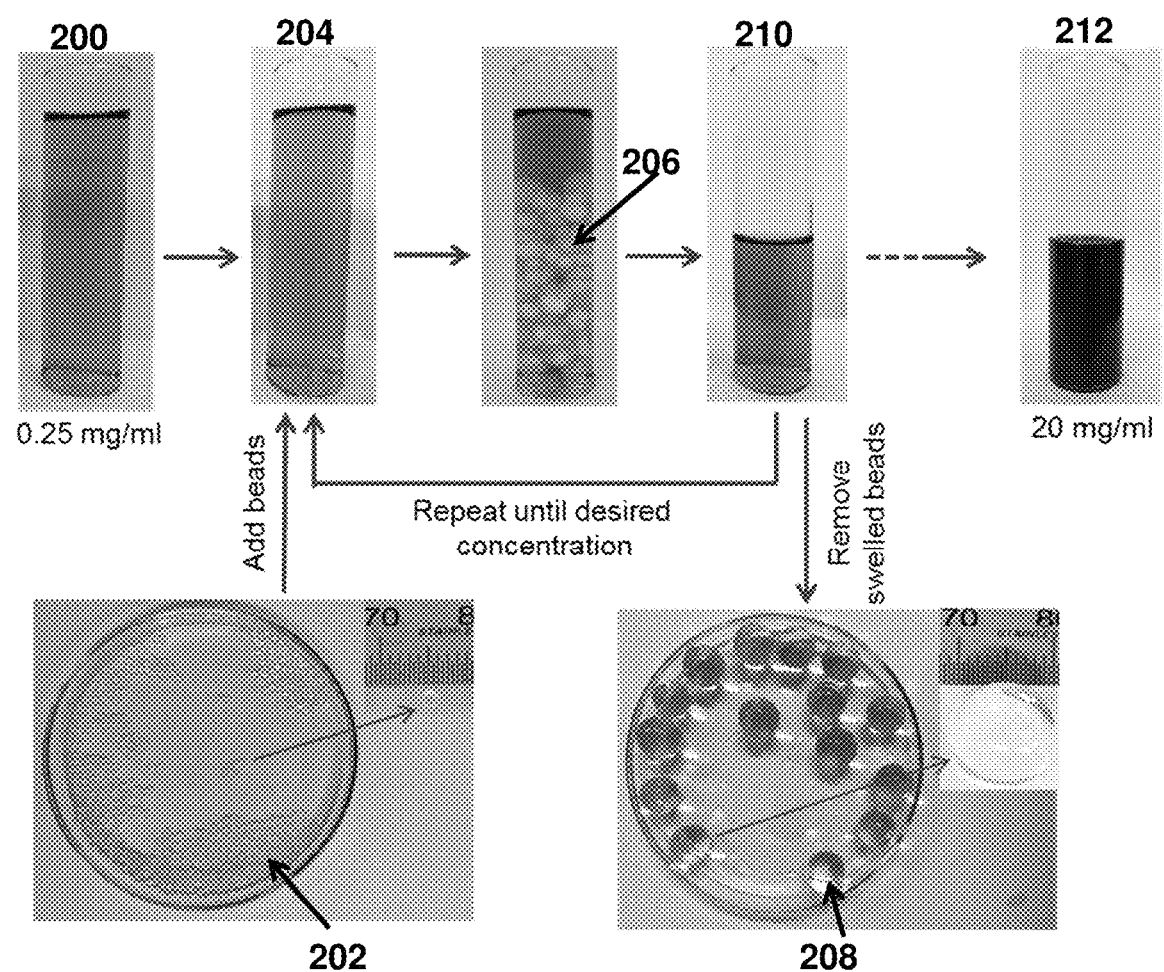
FIG. 1: Photographs of stable dispersions of graphene oxide undergoing concentration by addition of hydrogel beads.

FIG. 1 shows photographs of stable dispersions of graphene oxide undergoing concentration by addition of hydrogel beads. A solution 200 of graphene oxide was prepared with a graphene oxide concentration of 0.25 mg/mL. Hydrogel beads 202 having an initial dehydrated diameter of 2 mm were added to the solution to form a mixture 204 of the solution and hydrogel beads. The beads 202 absorb water from the solution and swell in-situ to approximately ten times their original diameter 206, removing water from the solution. The beads are then extracted from the solution using standard separation methods. As can be seen the extracted beads 208 are clear which indicates that only water has been absorbed by the beads. The graphene oxide sheets have not been absorbed by the beads, and have remained in solution. The quantity of water removed can be determined by the height differential between the original solution 200 and the intermediate resultant solution 210. Once removed, the extracted beads 208 can be dried and returned to their dehydrated state. The beads can then be reused (or further fresh beads may be provided) to further concentrate the solution 212 to a final desired concentration which in this case is around 20 mg/mL. This absorption process took approximately an hour and involved sequential addition of the hydrogel beads. In this case, around 9 g of sodium polyacrylate based hydrogel beads were used to make a 10 mL solution with a 20 mg/mL graphene oxide concentration. Each gram of the hydrogel beads absorbs around 90 mL water.

The volume of water that the hydrogel beads can uptake varies according to the type of hydrogel used. After the hydrogel beads have absorbed water, and have approached or have reached their fully swollen state, the beads may be separated from the solution. A variety of separation techniques can be suitably employed, such as using a sieve or other coarse filtration process to collect the beads from the solution. The skilled addressee will appreciate that a variety of different separation methods may be used depending on the final size of the beads, and the properties of the concentrated graphene or graphene oxide solution. The remaining concentrated solution can then be transferred to a smaller vessel to (due to the volume decrease in the solution as a result of water absorption) to which fresh hydrogel beads are added. These may be new hydrogel beads. Alternatively, the collected swollen hydrogel beads may be washed if necessary and treated to remove the absorbed water. Such treatment may include drying the beads either at ambient or at elevated temperatures, thereby returning the beads to a dehydrated and unswollen state. The hydrogel beads may then be conveniently recycled and reused. This water removal process can be repeated until the final desired concentration was reached.

The removal of water from the suspension causes the concentration of the graphite oxide particles to increase. As the concentration of these particles increases, the orientation entropy of the suspensions starts to decrease only to be compensated by increase in translation entropy leading to colloidal phase transitions from isotropic to nematic liquid crystalline phases—the onset of which is dependent upon the thickness to diameter ratio of the disc-like mesogens of GO.

Liquid crystallinity defines a state between a crystal and a fluid, which has been demonstrated in colloidal dispersions of GO within which the constituent sheets become anisotropic but can still flow and respond to macroscopic forcefields such as shear. The discotic nematic colloidal phase has a crucial role in enabling membrane formation which goes beyond the requirements of high solid contents necessary to produce a continuous film. The GO colloidal dispersions disclosed herein have been found to undergo an isotropic to nematic phase transition at around 5 mg/ml, remaining biphasic until around 15 mg/ml, and fully nematic phases are formed at concentrations of 16 mg/ml or greater. Typical physical properties of the GO colloidal suspensions representing isotropic, bi-phasic and fully nematic phases are provided in Table 1 below.

TABLE 1

Physical properties of a typical isotropic (0.1 mg/ml), onset of biphasic (5 mg/ml), biphasic (10 mg/ml), and fully nematic (40 mg/ml) colloidal suspensions of GO demonstrating a decrease in surface tension and contact angle which promotes wetting of the fluid on the porous substrate and an increase in dewetting time compared to drying time.

| sample no. | Concentration (mg · ml$^{-1}$) | Volume fraction | Surface tension (mN m$^{-1}$) | Contact angle (°) | Dewetting time (s) | Drying time (s) |
| --- | --- | --- | --- | --- | --- | --- |
| 1 | 0.1 | 0.005 | 71.9 | 81 | 0.012 | 40 |
| 3 | 5 | 0.27 | 68 | 70 | 0.151 | 40 |
| 4 | 10 | 0.55 | 66 | 67 | 15 | 40 |
| 8 | 40 | 2.22 | 49 | 49 | 4313 | 40 |

The concentrated aqueous solution of stabilised graphene and/or graphene oxide can be used to form a graphene oxide film. The inventors have found that the nematically-ordered fluid phases of GO have non-Newtonian flow characteristics, which can be harnessed to produce large area films by using shear forces such as in doctor blading and dip-coating.

Accordingly, in another aspect of the invention there is provided a method of forming a film of a stabilised solution of graphene oxide on a substrate surface. In this aspect a concentrated graphene oxide solution is used, such as a concentrated solution prepared according to the method described above.

The method includes applying the graphene oxide solution to a substrate surface using a coating or shearing apparatus. The size of a membrane that can be produced is limited by the size of the coating or shearing apparatus. Thus, large-area membranes can be produced with relative ease by increasing the size of the coating or shearing apparatus. Preferred coating or shearing apparatuses include a rod coater, a roll coater, a knife coater, a flexible applicator, a curtain coater, and a gravure coater. More preferably, a rigid blade shearing apparatus (typically known as doctor blade in industrial terminology) is used. This provides for large-scale, continuous, high-speed, liquid thin film processes.

In each case, the graphene oxide solution is drawn through a gap that is formed between a substrate surface and an application surface of a coating apparatus. For example, in the case of rod or roll coaters, there is a gap between an exterior surface of the rod or roller and the substrate surface; and for a knife coater there is a gap between an edge of the knife and the substrate. The solution is drawn through this gap at a desired shear rate by the relative movement of the substrate surface with respect to the surface of the coating apparatus. This results in the formation of a film of the graphene oxide solution on the substrate surface having a thickness that corresponds with the height of the gap.

The shear rate applied to the solution across the gap may be up to 200,000 per second, depending on the thickness of the required membrane, the viscosity of the solution and the interaction between the solution and the substrate.

Without wishing to be bound by theory, the inventors hypothesize that the high shear stress aligns or orientates the graphene sheets of nematic discotic phase packing them into a dense, continuous, uniform membrane over a porous support in a rapid single step. Thus, high shear rates assist in the formation of a uniform coating in which the graphene oxide crystals are substantially aligned, such as with a long axis of the graphene oxide crystals in a substantially parallel orientation with the substrate surface in the direction of the relative movement that applies the shear rate. There may be some degree of misalignment of the graphene oxide crystals without substantially affecting the final properties of the film, as such, the term substantially parallel orientation is intended to cover an alignment of the graphene oxide crystals is within +/−20 degrees from parallel; preferably, +/−10 degrees; even more preferably, +/−5 degrees.

Figure 2:
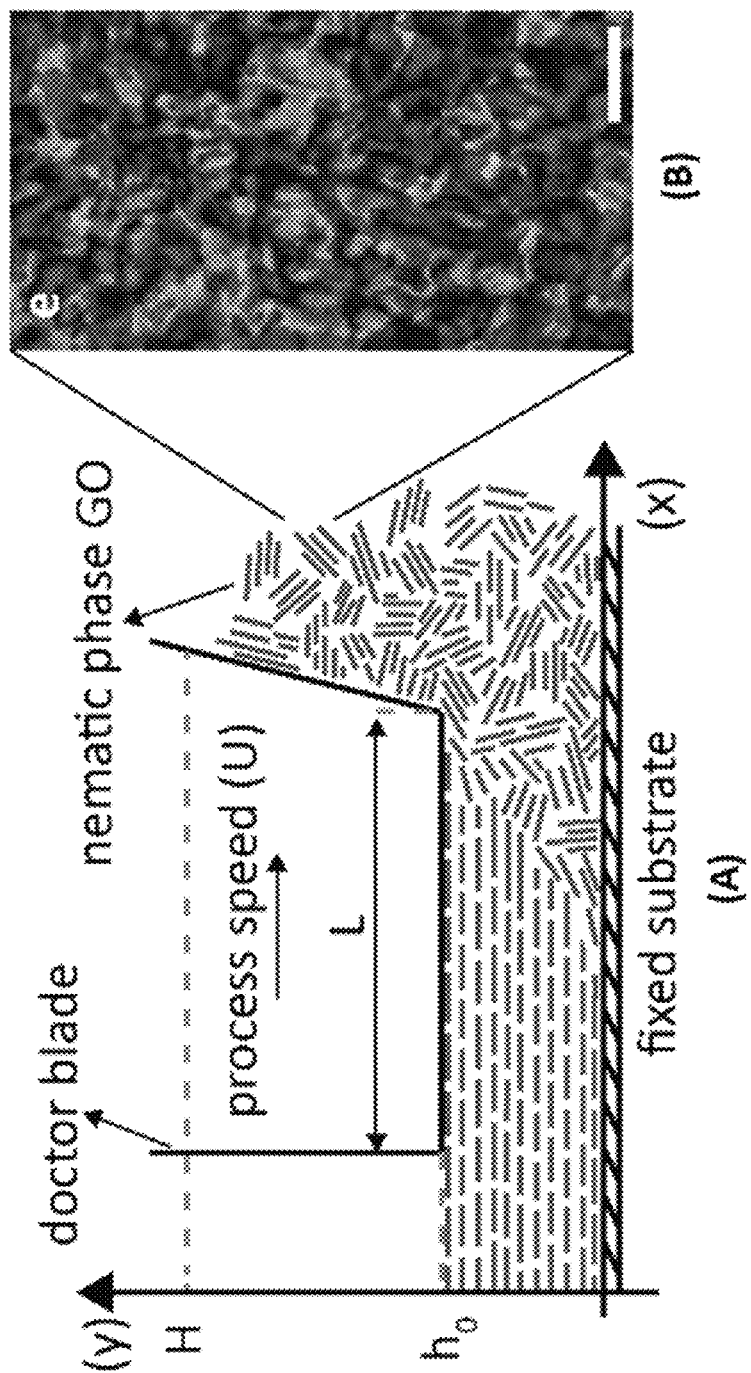
FIG. 2: (a) Illustration of an embodiment of the coating process of the present invention; and (b) image of the discotic nematic colloidal phase.

FIG. 2 provides an illustration of a preferred embodiment of the coating process using a doctor blade, and also shows the discotic nematic colloidal phase. Specifically, FIG. 2(a) shows a shear aligning process of a liquid crystalline suspension of graphene oxide. In the Figure: "L" is width of blade, "$h_0$" is gap height of flow channel between blade surface and substrate, "H" is the height of the suspension behind the blade, and "U" is casting speed. In this case, due to the small height $h_0$, high shear stress is generated as the doctor blade is drawn over the surface of the substrate and graphene oxide solution. This high shear stress is generated, in part, by the combination of high shear rate as well as the high viscosity of the graphene oxide. FIG. 2(b) shows the discotic nematic colloidal phase.

In this process, the solution exhibited two shear rates: one during the casting at around 10,000 $s^{-1}$, and one during the drying (~zero). This is because the graphene oxide solution is a non-Newtonian fluid. The high-shear rate viscosity affects the amount of shear stress which imposed to the solution during casting. This shear stress is highly effective in causing the alignment of graphene oxide sheets, and allows smooth and uniform casting of the liquid film (see Table 2 below). The zero-shear viscosity is effective during drying of the cast liquid film, since, high viscosity improve stability of the liquid film during drying to produce uniform and continues membrane (see Table 2 below).

TABLE 2

Physical properties of colloidal suspensions of GO and associated zero-shear viscosity, apparent viscosity, and imposed stress.

| Sample no. | Concentration (mg · ml$^{-1}$) | Zero-shear viscosity (at $10^{-3}$ s$^{-1}$) (Pa s) | Apparent viscosity (at $10^4$ s$^{-1}$) (Pa s) | Imposed stress by Doctor Blade (Pa) |
|---|---|---|---|---|
| 1 | 0.1 | 0.00128 | 0.0016 | 16 |
| 2 | 2.5 | 0.0016 | 0.0018 | 18 |
| 3 | 5 | 0.0094 | 0.003 | 30 |
| 4 | 10 | 0.8 | 0.0041 | 41 |
| 5 | 15 | 2.9 | 0.0059 | 59 |
| 6 | 20 | 5 | 0.008 | 80 |
| 7 | 30 | 18 | 0.0114 | 114 |
| 8 | 40 | 66 | 0.0164 | 164 |
| 9 | 60 | 311 | 0.03 | 300 |

The high shear rate causes suspension ordering of the graphene oxide liquid crystal domains in the suspension to pack, orient, and become confined into a very thin film over the substrate surface. Given the viscoelastic nature of the coating fluid the membrane thickness, compaction and molecular order can be tuned by adjusting shear rate and pressure during this coating process.

The membrane is formed directly on top of the underlying substrate surface. A range of different substrates may be used. For most applications, particularly where the intended application is filtration, it is preferred that the substrate is porous having pores with a pore size of 20 to 1000 nm. The substrate may be a porous polymer, metal, or ceramic. Preferred polymers include nylon, cellulose acetate, polysulfone, polyethylene, polyethylenetereptholate, polydimethyl siloxane, PTFE. Preferred metals include copper, aluminium, stainless steel. Preferred ceramics include alumina, silica, magnesia.

It has also been found that the concentration of the solution prior to the coating process is important for forming a uniform film. The solution should contain a sufficient amount of graphene oxide, to form continuous film, after water evaporation and drying. If the concentration of the graphene oxide in the solution is too low, then the resultant film may break or pin-holes may form in the film during the drying process. Without wishing to be bound by theory, the inventors believe that the concentration needs to be sufficiently high so that viscous forces can overcome capillary forces to resist dewetting and breakage of the film during formation. The inventors have found that continuous and homogenous films can be formed with a graphene and/or graphene oxide concentration of greater than 15 mg/mL, and preferably at least 20 mg/mL. This is why in many cases a solution of graphene and/or graphene oxide—such as that formed using Hummer's method—must first be concentrated to an appropriate level.

The method may additionally include altering the surface chemistry of the graphene film. This can be achieved by selectively removing or adding functional groups, such as hydroxyl, carboxyl, and epoxy groups from the graphene oxide membrane by a range of treatment mechanisms to form a highly stable reduced graphene oxide membrane.

Suitable treatments may include chemical treatment with hydrazine, sodium borohydrate, citrates, alkali such as KOH, NaOH; or physical treatment such as exposure to plasma, ion-beams, heat, UV light. This treatment results in a membrane that is chemically and structurally stable in a wide variety of solvents such as, but not limited to, water, ethanol, methanol, butanol, hexane, and toluene.

In certain embodiments, this treatment step can be used to make the resultant graphene membrane electrically conducting. The inventors have found that application of an electric field to the graphene membranes can affect permeability of ions and small molecules there through. Additionally, in one or more embodiments, the application of an electric field can advantageously be used to regenerate the membrane after fouling.

EXAMPLES

Overview

Graphene oxide (GO) was synthesized using the modified Hummer's method. SP-1 grade 325 mesh graphite powder (Bay Carbon Inc.), sulfuric acid, potassium persulfate, phosphorus pentoxide and potassium permanganate (Sigma-Aldrich), were used for the synthesis. The synthesized GO was exfoliated by sonication (UP-100 Ultrasonic processor) in RO water for 1 h, followed by centrifugation to remove the un-exfoliated GO. The average lateral size of the GO sheets was determined using a scanning electron microscope (FEI Nova NanoSEM 450 FEGSEM (2012)) and was estimated to be ~0.9±0.4 µm (90 sheets were measured to calculate the average sheet size). An Ocean Optics USB4000 UV-vis spectrometer was used to determine the GO concentrations by measuring the absorbance at 230 nm (using a quartz cuvette, Starna Cells Pty. Ltd. Australia). Various concentrations of GO dispersions were prepared using a superabsorbent polymer followed by further characterization.

The concentrated GO dispersions were then formed into continuous membranes by a doctor blade which enabled membrane formation by shear alignment of the liquid crystalline phases in the concentrated GO dispersions. Different thicknesses of membranes were cast onto porous Nylon substrates (Nylon 66, pore size 0.2 µm, MDI, India) with the appropriate GO dispersion (~40 mg/ml) by semi-industrial scale printing equipment. The shear aligned membranes (SAMs) were further characterized by polarized light imaging, X-ray diffraction (XRD) analysis, scanning electron microscopy (SEM), atomic force microscopy (AFM) and Fourier transform infrared spectroscopy (FTIR). The SAMs were cut into the required size (47 mm diameter) for filtrations tests. In order to increase the water stability of the SAMs, they were partially reduced by exposing to 0.02 ml of hydrazine hydrate vapour (88%, Merck) for 5 minutes by placing a hermetically sealed vessel containing the GO membrane onto a hot-plate at 60° C. The water permeability and retention capabilities (for different probe molecules and salts) of the membranes were examined using a dead-end filtration setup (Sterlitech HP4750 High Pressure Stirred Cell). Flux regeneration by chemical cleaning of the SAM was investigated by filtration of Bovine Serum Albumin (Sigma-Aldrich), as a common laboratory model foulant. The uniqueness of the shear-aligned membranes was compared with GO membranes produced by vacuum filtration in terms of structure and separation performance.

Concentrating Graphene Oxide (GO)

Traditional means to produce concentrated GO dispersions, such as the application of heat or the use of vacuum equipment, are time consuming and laborious. Instead, the present invention used superabsorbent polymer hydrogel beads which are strongly hydrophilic to form concentrated GO dispersions. Concentration of a GO dispersion occurs because of the ability of polymer hydrogel beads to absorb and retain water without the hydrogel beads dissolving in water or absorbing GO sheets. Typically, cross-linked polyacrylate copolymer based hydrogel beads (Demi Co, Ltd, China) were used. These hydrogel beads can absorb water up to 90 times their weight. The time taken to concentrate a GO dispersion depends on the initial concentration, the desired concentration and the mass of beads used. For example, within ~1 h a 10 ml GO dispersion with a concentration of 20 mg/ml was obtained from a 1 l suspension of 0.25 mg/ml GO using 10 g of the hydrogel beads. To avoid possible concentration polarization around the beads and to speed up the absorbent process the container was mildly agitated by a magnetic stirrer. After the hydrogel beads were saturated with water, they were removed from the concentrated solution. The GO deposits adhering to the surface of the saturated beads were removed by washing them with RO water. The saturated hydrogel beads could be reused after drying them at 50° C. overnight.

Characterisation of GO

Raman Characterization

Raman spectroscopy was used to investigate whether GO was absorbed into the hydrogel beads along with water. GO has two characteristic Raman peak at ~1330 cm-1 (D band) and ~1580 cm-1 (G band) corresponding to the amount of defects and in-plane bond stretching of sp2 carbon atoms respectively. If the hydrogel beads had absorbed GO during the concentration process, Raman spectra of the swollen beads would display these characteristic peaks. To this end, the Raman spectra of hydrogel beads which have swelled after soaking in a GO solution were compared to two control spectra: a GO film and hydrogel beads which have swelled after soaking in RO water.

Figure 3:
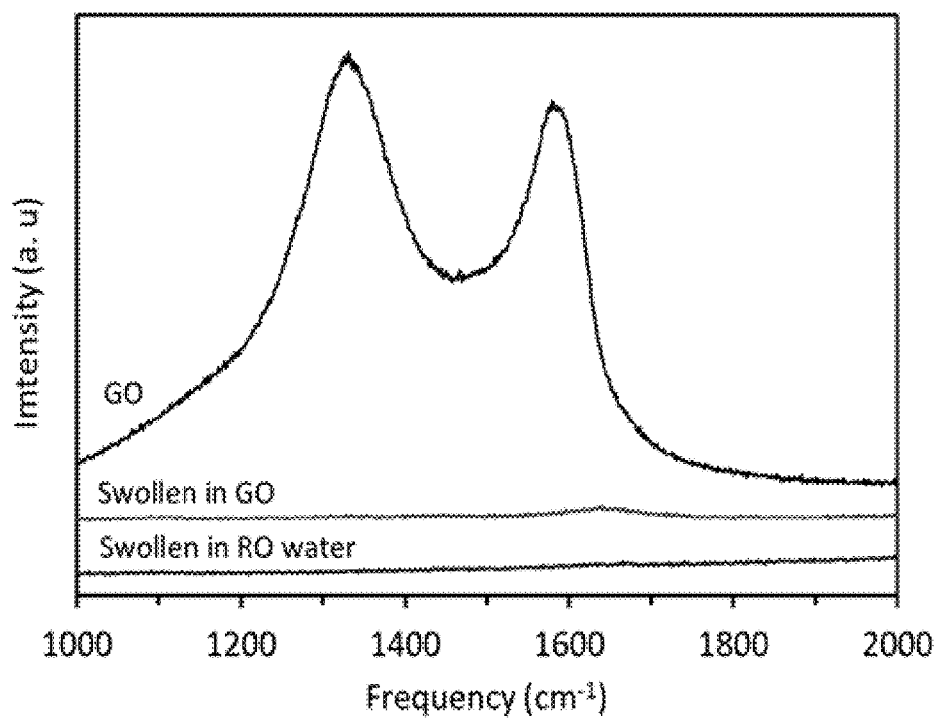
FIG. 3: Hydrogel bead Raman spectroscopy characterization. Raman spectrum of GO, the hydrogel bead swollen in GO solution and the hydrogel bead swollen in RO water.

The GO sample was prepared by drop casting of GO (5 mg/ml) on glass slide followed by drying overnight under ambient lab conditions. The saturated hydrogel beads (swollen in either 5 mg/ml of GO or in pure RO water) were cut by a stainless steel scalpel blade and mounted onto a glass slide. Raman spectra of GO and of the swollen hydrogel beads were obtained using a Renishaw Confocal micro-Raman Spectrometer equipped with a HeNe (632.8 nm) laser operating at 10% power. Extended scans (10 s) were performed between 100 and 3200 wave numbers with a laser spot size of 1 µm. Once the background was removed, the intensity of the spectra was normalized by dividing the data with the maximum intensity. The peak positions were found using the full width at half-maximum, as is common practice for analysing spectral data. As shown in FIG. 3, the characteristic peaks of GO were not observed within the hydrogel beads swollen in a GO suspension. Therefore, GO is not absorbed in the hydrogel beads during the concentration process, the beads only adsorb water from the GO suspension.

Rheology

A HAAKE MARS II Rheometer (Thermo Electron Corporation, Germany) was used to measure the viscosity of GO dispersions. A titanium coated cone-plate with a 60 mm diameter and a cone angle of 1° was used. The temperature inside the cone-plate was fixed to 22.00±0.01° C. by using a Peltier system and a thermostat HAAKE Phoenix II (Thermo Electron Corporation, Germany). The experiments were performed using 2 ml dispersions with a constant gap of 0.041 mm.

Figure 4:
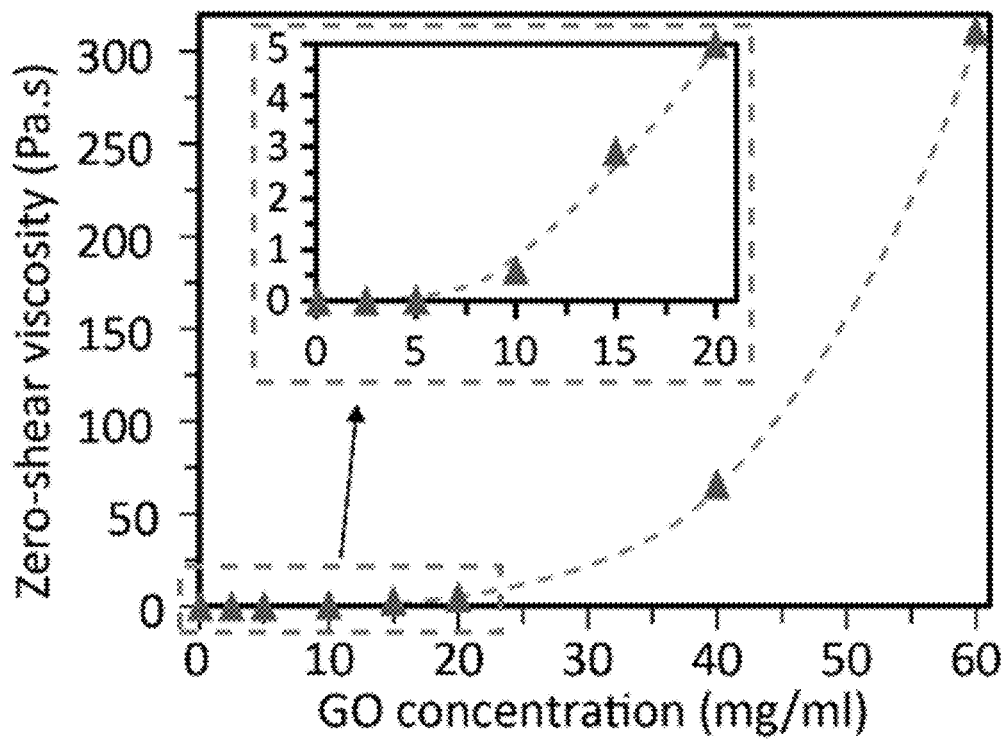
FIG. 4: Graph showing zero-shear viscosity of the dispersions increases with increasing GO concentration and the inset shows large changes in the viscosity from 5 mg/ml coinciding with the onset of the isotropic to nematic phase transition.

Zero-shear viscosity was evaluated by measuring the viscosity of the GO dispersions at a shear rate of 0.001 s$^{-1}$. FIG. 4 demonstrates that the zero-shear viscosity increases with an increase in GO concentration. The oxygen decorated GO sheets increased the zero-shear viscosity by forming hydrogen bonds amongst themselves and with water molecules. At low concentrations of GO, the water was attached to GO sheets via hydrogen bonds, but similar to water-clay dispersions, an increase in the number of GO sheets results in the assembly of graphene sheets and water molecules to form a three-dimensional network via hydrogen bonding, which decreases the fluidity of the suspension and increases the viscosity of the GO dispersions. Furthermore, the large changes in viscosity beyond a concentration of 5 mg/ml coincide with the onset of a liquid crystalline nematic phase.

Figure 5:
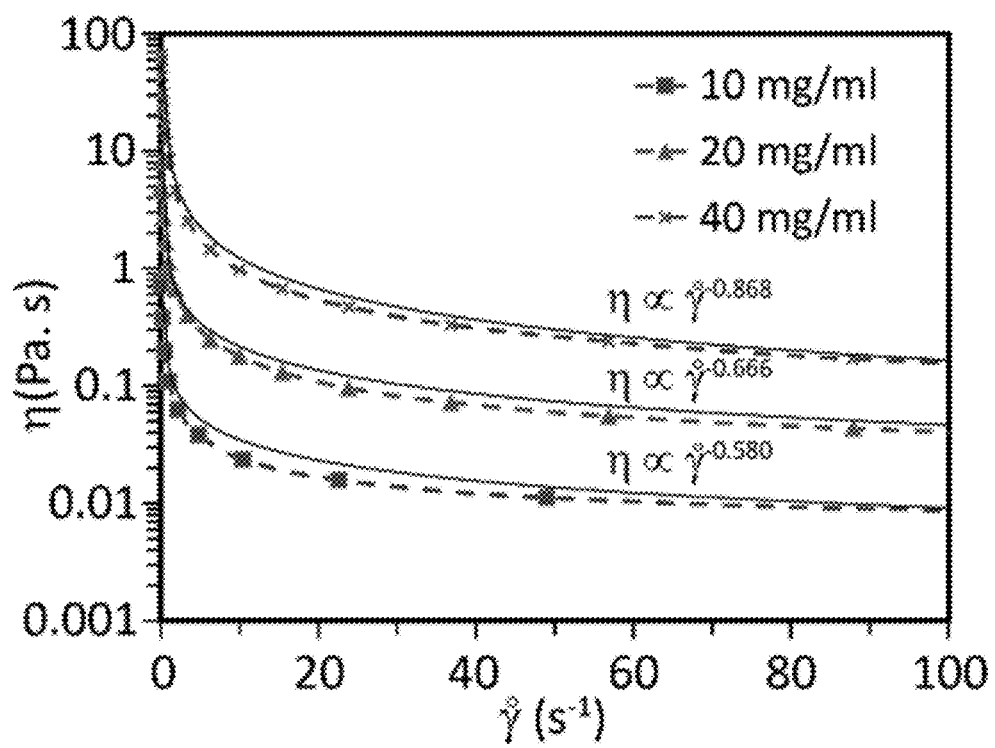
FIG. 5: Graph showing rheology data for three different concentrations showing shear-thinning behaviour. Solid curves are the fit of the experimental data with a power law model.

FIG. 5 presents apparent viscosity of the GO dispersion ($\eta$) as a function of shear rate ($\gamma$). The non-Newtonian shear-thinning (pseudoplastic) behaviour was observed at different concentrations of the GO dispersion. It is presumed that the nematic phases in the GO dispersion are distributed randomly and do not align at low shear rates, which results in higher viscosity. At high shear rates, the randomly distributed nematic phases align in the direction of shear stress and produce less physical interaction with each other, resulting in decreased viscosity. FIG. 5 shows that the viscosity of the GO dispersions was in good agreement with the power law viscosity model. In the power law model, the exponent for ideal plastic material is $-1$ and any deviations from this theoretical value shows a loss of plastic behaviour. The exponents decrease from $-0.580$ to $-0.087$ by increasing GO concentration from 10 mg/ml to 40 mg/ml, which affirms the increased plasticity arising from the nematic GO phases.

Surface Tension and Contact Angle

A custom-designed pendent drop apparatus was used to measure the surface tension of the GO dispersions as a function of the concentration. A drop was formed at the end of a capillary with 0.7 mm diameter, and a digital CMOS camera monitored the shape of the droplet. Customized software determined the surface tension of these dispersions by comparing the actual curvature with the theoretically-predicted curvature of the droplet estimated by Young-Laplace correlation.

The static contact angles between the GO dispersions and the Nylon substrates were measured by placing a droplet of a GO dispersion (~3 µl of volume) on a Nylon substrate using a capillary with a diameter of 0.7 mm. The digital camera was used to monitor the shape of the droplet immediately after the droplet deposition. The average value of the contact angle was measured from the measurements of the contact angles at five different locations on a Nylon substrate.

Several criteria were satisfied to ensure accurate measurement of the surface tension and the contact angle: the droplet was to be symmetric along the central vertical axis, the droplet should be shaped only by gravity and surface tension forces and no other forces such as viscosity should play a role in the motion or inertia of the droplet. Droplets formed by 40 and 60 mg/ml GO dispersions did not satisfy these criteria due to high viscosity of these dispersions, therefore the surface tension and contact angle values were estimated by linear extrapolation (see Tables 3 and 4 below) for these two cases.

TABLE 3

GO surface tension. Extrapolation of the surface tension to estimate surface tension at 40 and 60 mg/ml concentrations.

| | GO concentration (mg/ml) | | | | | | | | |
|---|---|---|---|---|---|---|---|---|---|
| | 0 | 0.1 | 2.5 | 5 | 10 | 15 | 20 | 40 | 60 |
| GO surface tension (mN m$^{-1}$) | 72.5 ± 2.1 | 71.9 ± 2.5 | 69.6 ± 1.6 | 68.0 ± 1.9 | 66.0 ± 1.3 | 65.1 ± 2.8 | 60.0 ± 1.6 | ~49 | ~39 |

TABLE 4

GO contact angle. Extrapolation of contact angle to estimate contact angle at high GO concentrations.

| | GO concentration (mg/ml) | | | | | | | | |
|---|---|---|---|---|---|---|---|---|---|
| | 0 | 0.1 | 2.5 | 5 | 10 | 15 | 20 | 40 | 60 |
| Contact angle (degree) | 83 ± 6 | 81 ± 4 | 73 ± 2 | 70 ± 3 | 67 ± 4 | 64 ± 5 | 62 ± 3 | ~49 | ~36 |

The arguments for using linear extrapolation for these dispersions are that the surface tension of GO dispersions decreases with increase in GO concentration given that GO has been considered to possess surfactant-like properties. The contact angle between the GO dispersion and the Nylon substrate decreases with decreasing surface tension, which is consistent with inverse correlation between contact angle and surface tension in Young's equations:

$$\cos \theta \propto 1/\gamma_{LA}$$

where, $\theta$ is contact angle between the GO dispersion and a Nylon substrate, and $\gamma_{LA}$ is the interfacial surface tension of the GO dispersions.

Membrane Fabrication

Basic Concept of Thin Film Production by Doctor Blading

A lab-scale doctor blade which spreads the fluid under Couette flow through a thin rectangular channel was used to investigate the effect of shear stress on orientating the graphene sheets of nematic discotic phase and packing them into a dense, continuous, uniform membrane over a porous support in a rapid single step.

Figure 6:
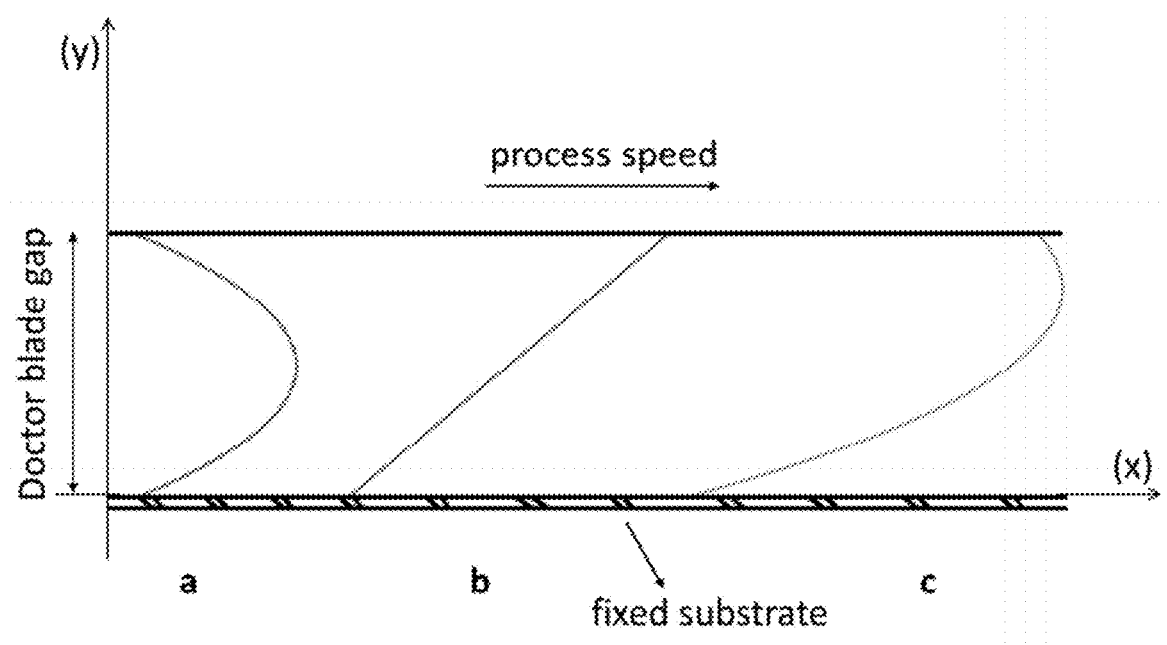
FIG. 6: Flow profile schematic of velocity profile in doctor blade channel for: (A) channel flow, (B) couette flow and (C) total flow.

To elucidate the essential physical parameters in the doctor blading process generic Navier-Stokes equations was used to analyse the flow dynamics of the casting liquid in a rectangular channel of doctor blade assuming that the fluid flow is Newtonian. The fluid flow in the doctor blade gap is governed by a combination of pressure driven flow (resulting from the hydrostatic pressure of the GO dispersion in front of the blade) and the Couette flow (resulting from the external shear of the blade—see FIG. 6). The velocity profile is calculated by:

$$u(y) = \frac{Uy}{h_0} + \frac{1}{2\mu}\frac{\rho g(y-H)}{L}y(y-h_0)$$

Where, u is the flow velocity in the y direction, U is the casting process speed, μ and ρ are the apparent viscosity and the density of the GO dispersion, respectively. H is the height of the GO dispersion in front of the doctor blade, $h_0$ and L are the dimensions of the blade gap (see FIG. 2). Based on experimental conditions (U=1 cm/s, $h_0=10^{-6}$ m), the external shear of the blade dominates the fluid behaviour in the blade gap, therefore the total velocity profile of the dispersion in the blade gap may be considered as:

$$u(y) = \frac{Uy}{h_0}$$

Here, the shear rate is calculated as:

$$\dot{\gamma} = \frac{du}{dy} = \frac{U}{h_0}$$

and the shear stress is defined by: $\tau = \eta\dot{\gamma}$, therefore, the imposed shear stress (of which the viscosity of the fluid is the dominant material parameter) is given by:

$$\tau \approx \eta\frac{U}{h_0}$$

where τ is shear stress, η is viscosity of the GO dispersion, U is process speed and $h_0$ is the doctor blade gap size. GO fluids from 0.1 mg/ml to 60 mg/ml were studied with systematic variation of viscosity. The method used for concentrating the GO fluids (discussed previously) enabled rapid screening of this concentration range. The uniformity and continuity of the membrane arises from a competition between two factors: the casting of a uniform liquid film and then maintaining the stability of the liquid film during drying This equation estimates the total shear stress that the doctor blade imparts on the GO dispersions. Since the casting velocity and the doctor blade gap were kept constant during the experiments, the shear stress is dependent on the viscosity of the GO dispersion. Thus the imposed high shear stress (see Table 2) aligns the nematic phase GO sheets.

Figure 7:
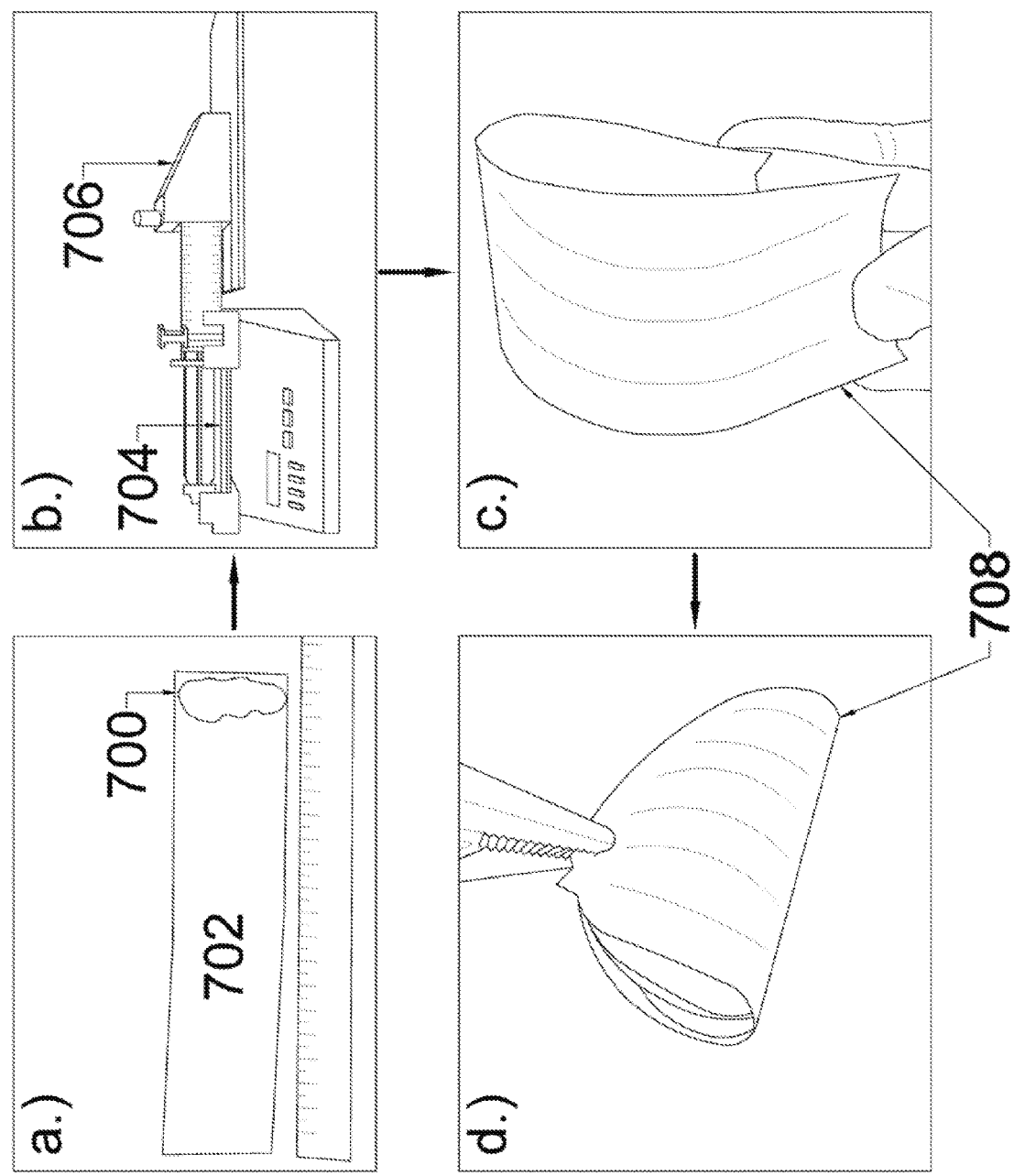
FIG. 7.

FIG. 7 illustrates the experimental setup that was used to form a membrane of concentrated graphene oxide solution. FIG. 7(a) shows the application of this concentrated solution 700 to the porous nylon substrate 702. FIG. 7(b) shows a syringe pump 704 that was modified to include a doctor blade assembly 706 to apply a desired shear rate across the graphene oxide solution. An asymmetric and supported graphene membrane 708 was formed. Asymmetric membranes have a thin functional layer which performs the role of separation, with a thicker support beneath to provide mechanical support and stability to the membrane. FIG. 7(c) shows that the resultant supported graphene oxide membrane 708 demonstrates excellent flexibility. FIG. 7(d) shows the membrane 708 after a post-fabrication deoxygenation step in hydrazine vapour.

Figure 8:
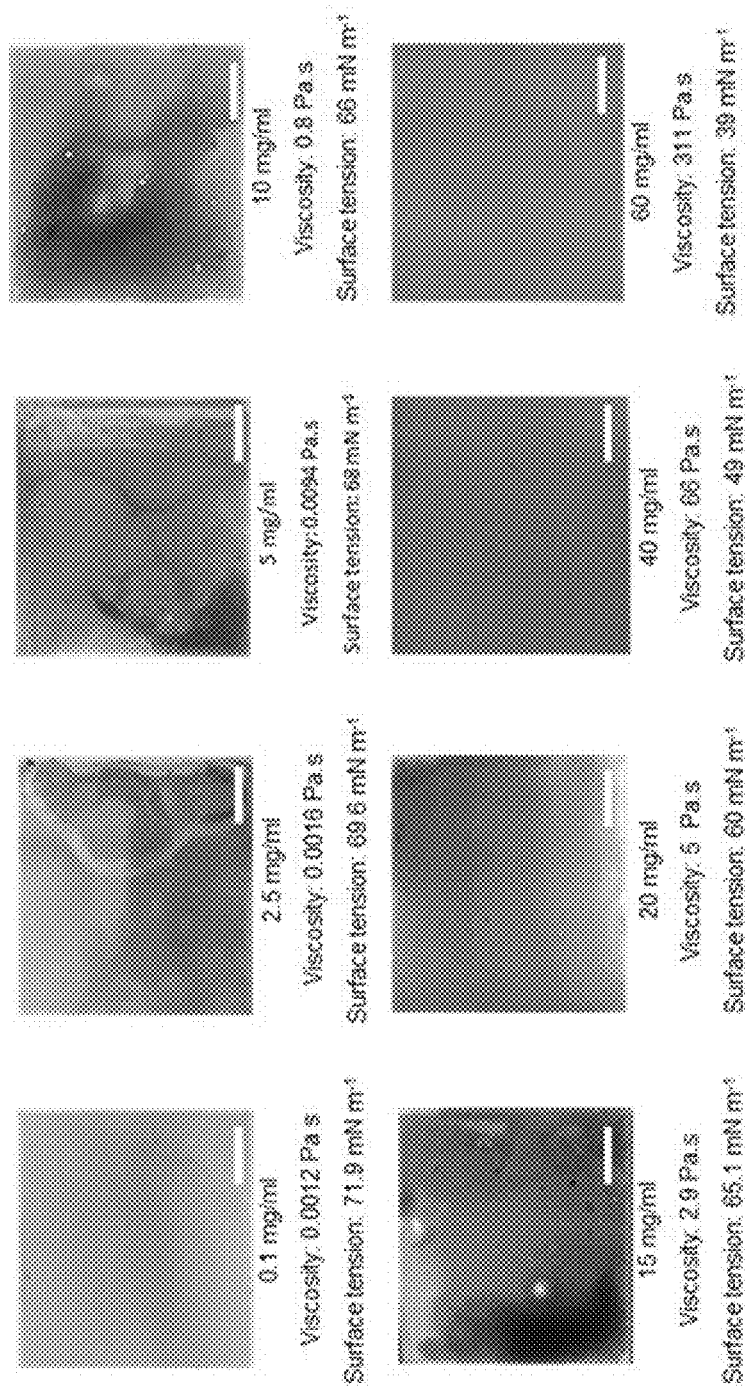
FIG. 8: Effect of GO concentration on uniformity and continuity of film. Photographs which show the top surface of the shear-aligned membranes cast from different concentrations of GO under the same conditions of applied shear rate. It can be seen that by increasing concentration of GO (which results in an increase in viscosity and a decrease in surface tension) the uniformity and continuity of the cast membranes is improved. All scale bars are 1 cm.
Figure 9:
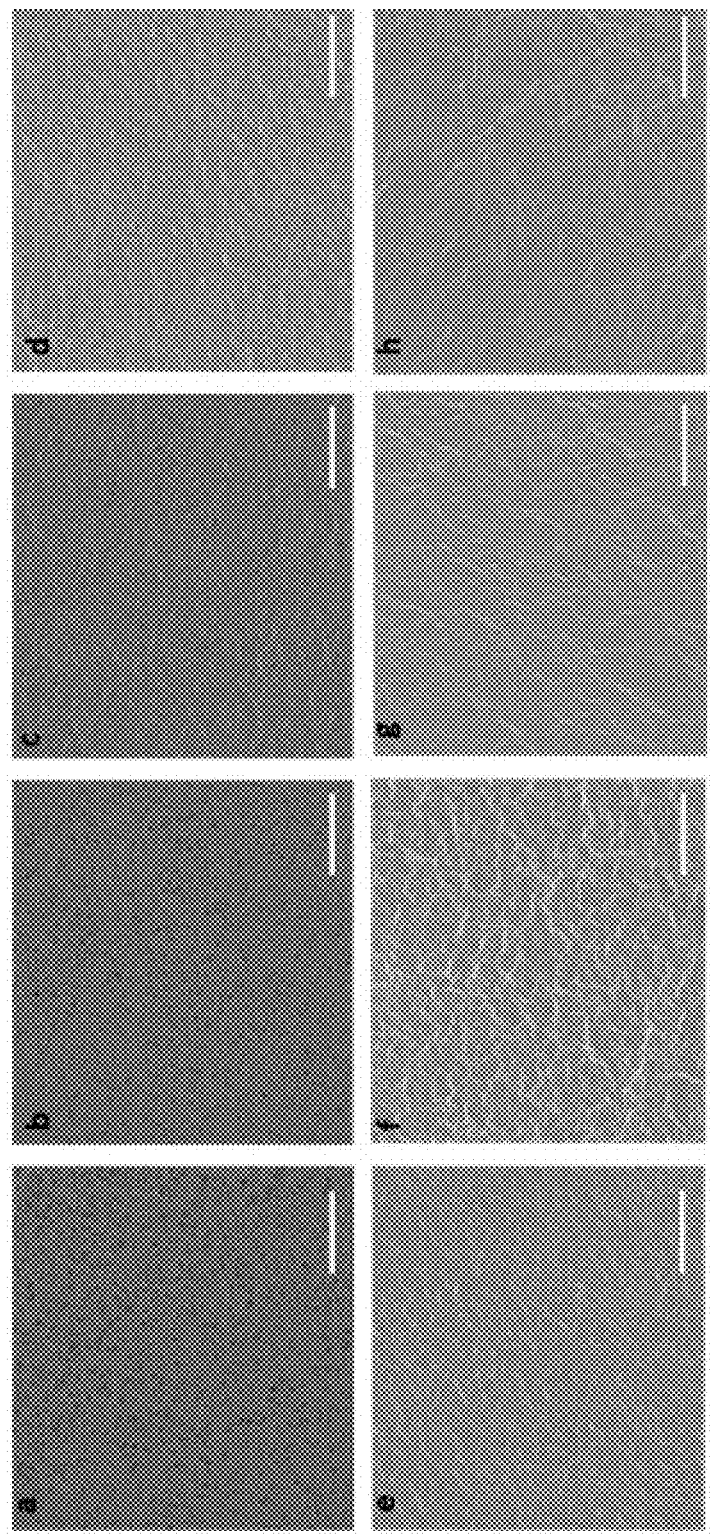
FIG. 9: Scanning electron microscopy characterization. SEM images of the top surface of our GO membranes cast by progressively increasing concentration: (a) 0.1 mg/ml, (b) 2.5 mg/ml, (c) 5 mg/ml, (d) 10 mg/ml, (e) 15 mg/ml, (f) 20 mg/ml, (g) 40 mg/ml, (h) 60 mg/ml. With increasing concentration pin-holes and drying defects are eliminated. Continuous and homogenous films start forming beyond 20 mg/ml. All scale bars are 50 μm.

FIG. 8 (photographs) and FIG. 9 (SEM images) reveal that the uniformity of the cast film increased with increasing GO concentrations. In particular, FIG. 9 shows SEM images of the surface topography for graphene oxide membranes formed from initial solutions of different concentrations, specifically (a) 0.1 mg/ml, (b) 2.5 mg/ml, (c) 5 mg/ml, (d) 10 mg/ml, (e) 15 mg/ml, (f) 20 mg/ml, (g) 40 mg/ml, (h) 60 mg/ml. The scale bar is 50 μm. As can be seen in the SEM images, with increasing concentration pin-holes and drying defects are eliminated; and continuous homogenous films result where a solution with a graphene oxide concentration of at least 20 mg/ml is used.

Figure 10:
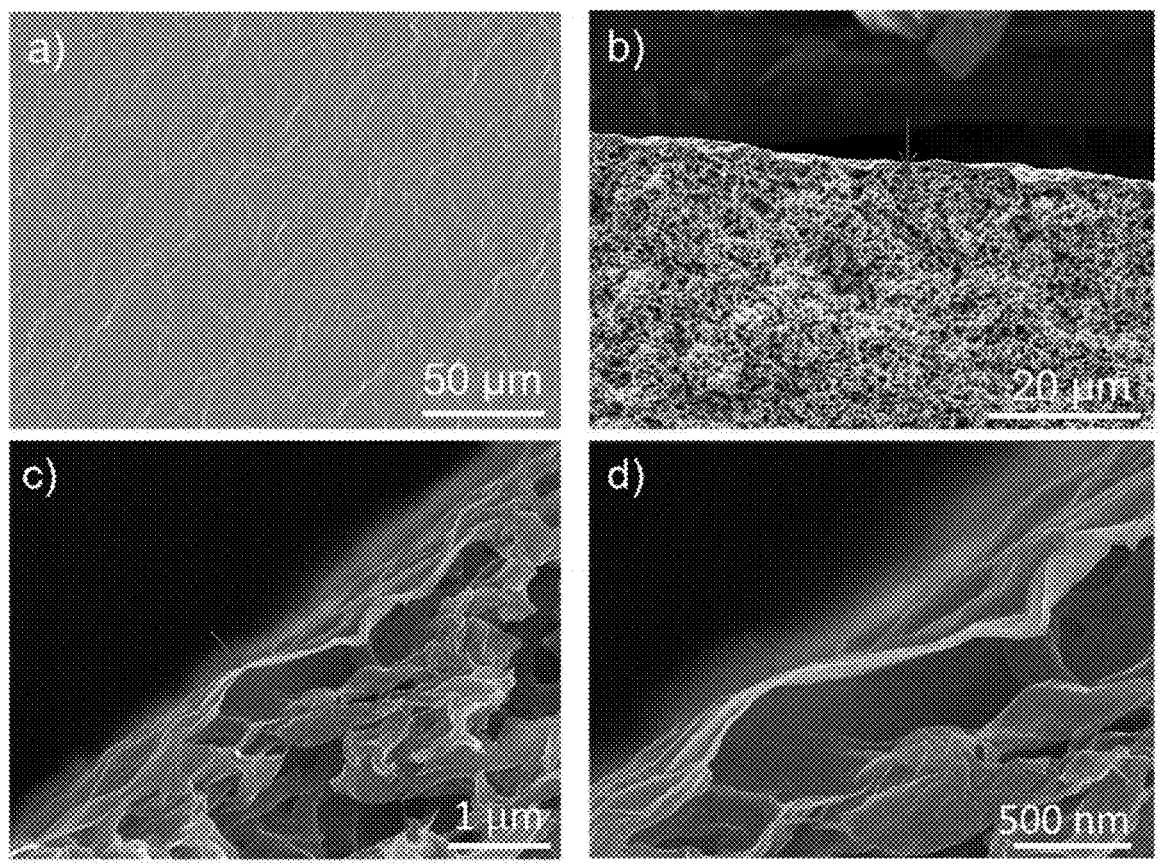
FIG. 10: SEM images of an asymmetric membrane having a thickness of 10-40 nm thin membrane and on a porous nylon backing, made by 60 mg/mL graphene oxide concentration.

Given the viscoelastic nature of the coating fluid the membrane thickness, compaction and molecular order can be tuned by adjusting shear rate and pressure during the aforementioned coating process. Scanning electron microscope images of an asymmetric membrane (10-40 nm thin membrane over a porous nylon backing) is shown in FIG. 10. The SEM images in FIG. 10 are of a graphene-based membrane formed from a graphene oxide solution having a 60 mg/ml concentration. FIG. 10(a) shows the top surface of the continuous graphene oxide membrane. As can be seen, wrinkles arise from the folding of graphene oxide sheets. FIGS. 10(b), (c), and (d) demonstrates continuity, conformity and thickness of the graphene oxide membrane on a porous nylon substrate under different magnifications.

Figure 11:
FIG. 11: Photograph showing viscoelastic GO (~40 mg/ml); scale bar is 1 cm.

The GO dispersions are shear-thinning, pseudoplastic fluids especially in high volume fractions and are highly viscous in zero-shear and very thin at high shear rate (see FIG. 11 showing a photograph of viscoelastic GO and FIG. 4)—this is instrumental in obtaining a uniform membrane by shear alignment. For example, a GO dispersion at 40 mg/ml would have a zero-shear viscosity of 66 Pa s, but at a shear rate of 104 $s^{-1}$, relevant to the disclosed process, it will decrease to 0.0164 Pa s meaning that the nematic phase becomes fluid when forced under the micron scale outlet of the blade; membrane formation is also accentuated by the smaller surface tension and smaller contact angle of the nematic fluid (see Table 1) to wet the underlying porous membrane.

Figure 12:
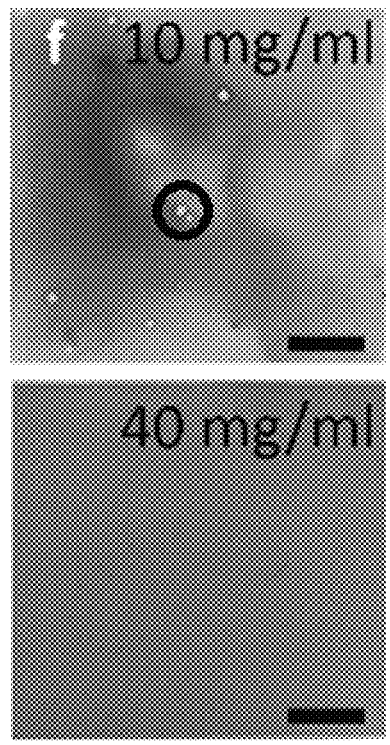
FIG. 12: Photograph showing SAM. The red circle in the photograph identifies dewetting spots in the SAMs, which is eliminated when processed from liquid crystalline GO; scale bars are 1 cm.

In order to obtain a uniform membrane it is critical to ensure that the processed liquid film from the GO dispersions remains uniform and continuous until it dries. If for any reason, the liquid film moves or migrates on the substrate, dewetting may ensue and the uniformity and continuity of the film degrades (see FIG. 12 and FIG. 8). Thus, to maintain stability of the liquid film during drying, the film needs to resist dewetting.

In general, dewetting occurs on nonwettable substrates and can also be initiated by various film-thinning mechanisms, which persist until holes are produced and the film is ruptured. A large number of factors influence dewetting, such as solvent evaporation (especially in case of low concentration dispersions), electrostatic repulsion (or attraction) forces between the dispersion and the substrate, dispersion migration due to gravity or capillary-driven flow, film thickness and viscosity and surface tension gradients.

Amongst all film-thinning mechanisms, the predominant factor for dewetting is low viscosity and high surface tension of the dispersion.

The dewetting time can be estimated by $$t_{dewet} = \left(\frac{\mu L}{k\sigma\theta^3}\right),$$

where $t_{dewet}$ is the dewetting time (s), $\sigma$ (N/m) and $\mu$ (Pa·s) are the surface tension and the viscosity of the dispersion, respectively, and $\theta$ (rad) is the contact angle between the dispersion and the substrate. k is a constant related to the fluid property and is assumed to be $10^{-3}$ for water-based system. L is the length scale, which is estimated as 10% of the substrate width. Drying time is the time between casting the liquid film and its solidification which is defined by $$t_{dry} = \frac{\Delta h}{J_0},$$

where $\Delta h$ is a parameter estimated to 80% of the thickness of the liquid film and $J_0$ is the solvent evaporation current (cm·s$^{-1}$). In order to avoid rupture and obtain a continuous and uniform film, the drying time must be lower than the dewetting time.

To evaluate film stability and dewetting phenomena and obtain the optimal conditions required for production of a continuous GO film, a simple lab-scale doctor blade (MTI Corporation, USA) was used for various GO concentrations. The doctor blade has a rectangular outlet formed between the blade and the substrate, through which the movable blade spreads the GO dispersion on the substrate (see FIG. 2). The doctor blade gap size was ~1 μm and the casting speed was ~1 cm/s. Typically, in order to prepare a GO film, 1 ml of a GO dispersion was spread over a porous Nylon substrate (Nylon 66 membrane, pore size 0.2 μm, 5×5 cm$^2$, MDI, India) using the doctor blade. A syringe pump was used to precisely control the movement of the doctor blade. Subsequently, the resultant liquid films were dried overnight under ambient conditions.

$J_0$ was calculated by recording the mass loss of the liquid film upon drying. The volume of the liquid film was calculated by considering the density of GO (~1.8 g/ml 22), using the mass and concentration of the GO dispersion. Dividing the volume with the area of the liquid film, we obtained the thickness of the liquid film during drying and subsequently calculated $J_0$ (2×10$^{-6}$ cm s$^{-1}$).

Figure 13:
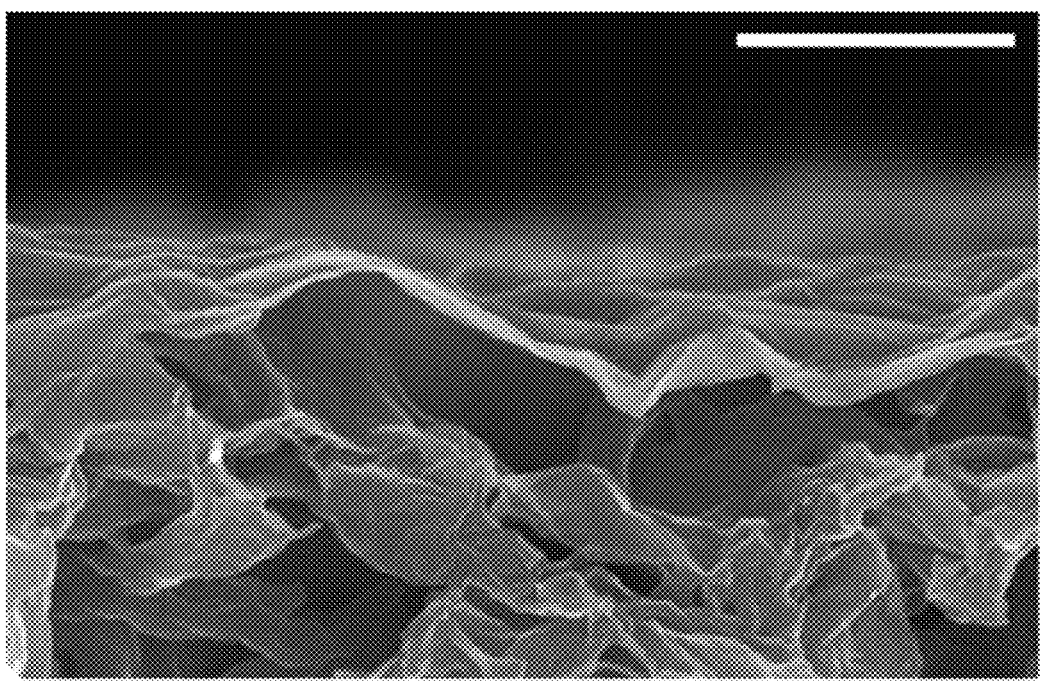
FIG. 13: SEM image showing continuity and conformity of SAM over a porous Nylon substrate; scale bar is 1 μm.

With increasing GO concentration, because of the enhanced zero-shear viscosity and lower surface tension, the dewetting time-scale of the nematic fluids can be easily increased by over 6 orders of magnitude (see Table 1). For concentrations above 40 mg/ml the dewetting time was significantly larger than the drying time ensuring the stability of the liquid film. Optical images and SEM and (see FIGS. 8 and 9) confirm that dewetting in films formed from such high concentrations is prohibited. FIG. 13 is an SEM image showing the thin, highly uniform, continuous, and compact multilayer structure of the GO membrane on a porous Nylon (0.2 μm pore size) substrate. To demonstrate the proficiency of our approach in membrane production large-area GO membranes were made by a gravure printer, with thicknesses ranging from ~65 nm to ~360 nm, on porous Nylon substrates (see FIG. 14). Although several methods using solution chemistry or energetic radiation can be used to chemically reduce the membranes, as a proof-of-concept to stabilize the membranes in aqueous environment we partially reduced the GO membranes by exposure (~5 min) to hydrazine vapour.

The films made by 40 mg/ml and 60 mg/ml GO suspensions have best uniformity and continuity. This can be attributed to the increase in the zero-shear viscosity, the increased the contact angle and the decrease in the surface tension at the high concentrations of GO which consequently increased the dewetting time. In fact, the dewetting time increased from 0.012 s to 4313 s with an increase in GO concentration from 0.1 mg/ml to 40 mg/ml (see Table 1). Since the drying time (40 s) in case of 40 mg/ml GO dispersion was significantly lower than the dewetting time (4313 s), uniform films could be produced under these conditions.

Semi-Industrial Scale Production of Graphene-Based Membranes by Shear Alignment

Figure 14:
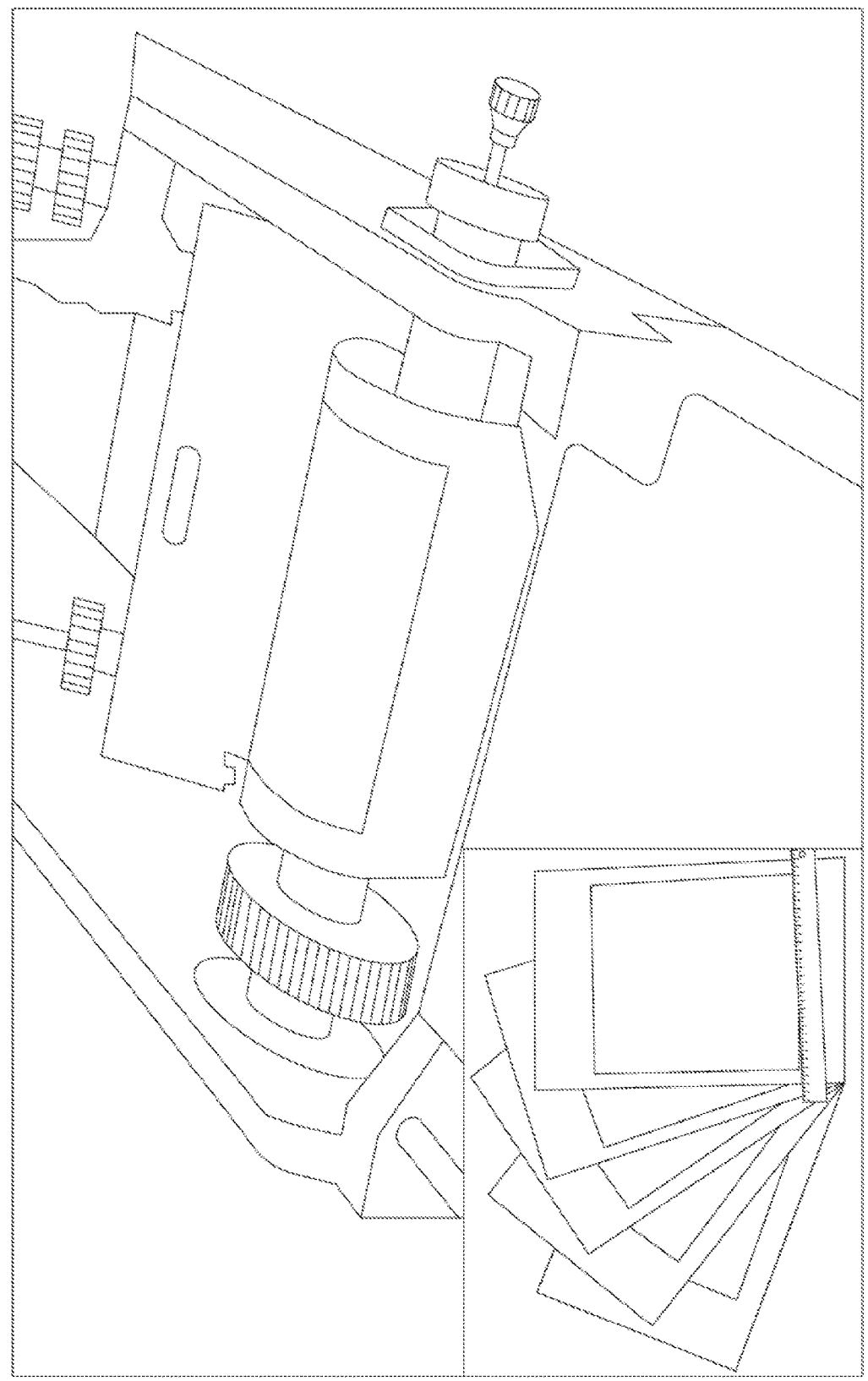
FIG. 14: Photograph of the gravure printing machine and (inset) images of 13×14 $cm^2$ GO membranes with different thicknesses.

Large-area, continuous, supported GO membranes were prepared using a conventional gravure printing machine (Labratester, Norbert Schläfli Machinery Company, Switzerland) (see FIG. 14). Labratester is typically used as a fabrication tool for printing viscous inks on various grades of papers, copper foils, aluminum foils and polymer sheets. To produce GO membranes, small quantities of GO dispersion were placed on the printing plate which was spread by a doctor blade. Subsequently, a rubber-coated roller pressed the substrate on to the printing plate and transferred the liquid film from the printing plate to the substrate. GO membranes were prepared using GO dispersions (40 mg/ml) and 13×14 cm$^2$ porous Nylon substrates (Nylon 66, pore size 0.2 μm, MDI, India). GO membranes with different thicknesses were prepared by repeating the printing process several times on the same substrate. The average thickness of the GO membrane was evaluated by AFM measurements.

Membrane Characterization

Polarized Light Imaging

Figure 15:
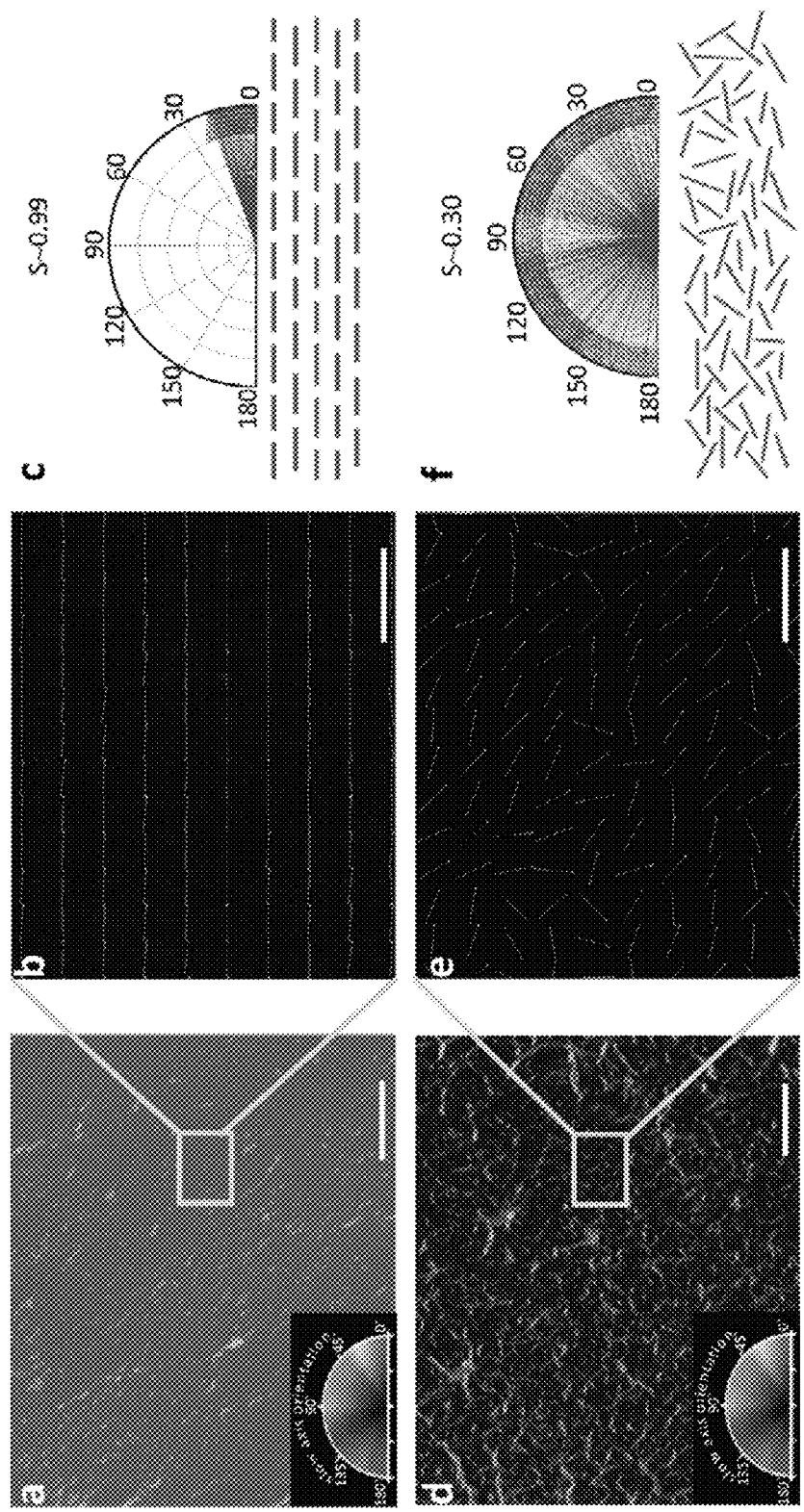
FIG. 15: Polarized light images of (a-c) SAM and (d-f) vacuum filtration membrane. The SAM and vacuum filtration membrane are made from the nematic phase GO at ~40 mg/ml and isotropic phase at ~10 μg/ml, respectively. (a) and (d) are falsely coloured polarized light images, where the hue represents the azimuth as depicted by the legend (scale bars are 50 μm). Regions with the same hue represent the same azimuth angle, so the SAMs have higher in-plane stacking order while vacuum filtration membranes have lower stacking order. This is supported by their slow axis vector representations (b, e), which are expanded view of the boxed areas (Scale bar is 10 μm), polar histograms of the azimuth angles and the in-plane order parameters (c and f).

Polarized light microscopy was carried out using a Leica DM IRB microscope with a LC-PolScope (LPS) Abrio imaging system from CRI Inc. The LPS was used to characterize the orientation order of the GO sheets to understand the effect of shear alignment arising from doctor blade casting. This technique has been widely used for order parameter characterization of molecules and particle as well as graphene oxide sheets in liquids or solid state films. The optical anisotropy of SAM is compared with those synthesized by vacuum filtration. FIGS. 15 (a) and (d) show the processed false colour images of the azimuth orientation of the GO assemblies for SAM and vacuum filtration membranes where the hue represents the azimuth angle. Similarly, FIGS. 15 (b) and (e) display the vector representation of the azimuth angle. In comparison with the vacuum filtration membrane, a distinctly uniform hue (also represented as orientated azimuth vectors) was observed for SAM, suggesting that they exhibit a higher orientational order.

Scalar parameter S for the distribution of the azimuth angles in the x-y plane was used to quantify the alignment of the GO sheets. The scalar parameter is defined by:

$$S = \tfrac{1}{2}\langle 3\cos^2\theta - 1\rangle$$

where $\theta$ is the angle between the mean azimuth (the director axis) and the azimuth at each pixel (the long axis of each graphene sheet). S=1 represents parallel alignment with the director and a perfectly oriented system whereas S=0 represents a system with completely random orientations. LPS imaging required GO membranes to be transferred onto glass slides. Nylon substrates supporting the GO membranes were etched using concentrated hydrochloric acid (Sigma Aldrich), and the obtained free standing GO membrane was transferred to a microscope glass slide. S was calculated from the azimuth data (1000 pixels).

X-Ray Diffraction Methodology

XRD patterns of the GO membranes were obtained using a Phillips 1140 diffractometer with Cu Kα line generated at 40 kV and 25 mA at a scan rate of 1°/min, and a step size of 0.02°. XRD samples were prepared by etching the Nylon substrates with concentrated hydrochloric acid (Sigma Aldrich) and by transferring the free standing GO films on glass slides. XRD patterns revealed that the broad range of interlayer space of GO sheets in vacuum filtration membrane compare with narrow range for shear-aligned membrane (see FIG. 16). This XRD data is in good agreement with the results obtained by LPS imaging and supports the conclusion derived from LPS that the lamellar structure of SAM are more organized and ordered than those obtained from vacuum filtration.

We have also measured the average interlayer space between GO sheets in the partially reduced SAM to estimate the pore size relevant to our filtration experiments XRD of the partially reduced membrane showed an intense peak at $2\theta=9.3°$, which corresponds to an interlayer spacing of 9.5 Å (see FIG. 17). The presence of a weak, broad peak between $2\theta=15.4°$ and $2\theta=28.6°$ indicates that the GO membrane has been partially reduced.

Scanning Electron Microscopy (SEM)

The films were cast using a lab-scale doctor blade (MTI Corporation, USA) and prepared using different concentrations of GO dispersions. The uniformity and continuity of these GO films were then analysed by a high resolution scanning electron microscope (FEI Nova NanoSEM 450 FEGSEM (2012)), typically operating at 5 keV. All the samples were coated with Iridium by a Cressington 208 HR sputter coater. For cross-sectional imaging, the Nylon supported GO films were cut into rectangular strips which were soaked in liquid nitrogen for 30 seconds and were then carefully snapped with flat tweezers. Cross-sections were mounted vertically on a metal stub and imaged at 15 keV.

Atomic Force Microscopy (AFM) Study of Membrane Thickness

The membranes were cast by Labratester to different thicknesses. Free standing GO membranes were prepared by etching nylon substrates in concentrated hydrochloric acid (Sigma Aldrich). Subsequently, these free-standing GO films were transferred to microscope glass slides. Atomic force microscopy measurements were carried out using a JPK Nanowizard 3 to calculate the thickness of GO membranes. This instrument is equipped with capacitive sensors to ensure accurate reporting of height, z, and x-y lateral distances. Imaging was performed in tapping mode using a Bruker NCHV model cantilevers with diameter 10 nm, with nominal resonant frequencies of 340 Hz, spring constant of 20-80 N/m. Images were obtained with a set-point force of 1 nN. The cantilever drive frequency was chosen to be 5% smaller than the resonance frequency. The thickness of the GO films were estimated from the height difference between the glass and the GO films from three different positions using a line scan as is shown in FIGS. 18 and 19 for the membrane with a thickness of 150±15 nm.

Fourier Transform Infrared Spectroscopy (FTIR)

To evaluate the presence of functional groups in the GO membrane and partially reduced membrane, FTIR spectra of the membranes were recorded using an attenuated total reflectance Fourier transform infrared (ATR-FTIR) (PerkinElmer, USA) in the range of 500-4000 cm$^{-1}$ at an average of 32 scans with a resolution of 4 cm$^{-1}$ (see FIG. 20). The overall ATR-FTIR spectra of GO and the partially reduced GO films both consisted of the typical GO oxygen functional groups such as C=O (~630 cm$^{-1}$-~1150 cm$^{-1}$ and ~1650 cm$^{-1}$), C—OH (~1380 cm$^{-1}$) and C—O (~2390 cm$^{-1}$). In case of the partially reduced GO film, the intensities of the peaks at 1650 cm$^{-1}$ (corresponding to C=O) and ~3400 cm$^{-1}$ (corresponding to C—OH) have significantly decreased, while the peak at 1570 cm$^{-1}$ (corresponding to C=C) has significantly increased, confirming a partial reduction of the GO membrane, in agreement with the observed XRD spectra (see FIG. 17) for these two specimens.

Nano-Filtration Characterization of the Shear-Aligned Membrane

To obtain comprehensive information about the retention properties of SAMs, the SAMs were tested as nanofiltration membranes using a commercial bench-scale stainless steel dead-end stirred-cell filtration unit (Sterlitech HP4750) (see FIG. 21 which set up includes: adjustable nitrogen pressure 2100, feed tanker 2102, magnetic stirrer 2104, and filtered water outlet 2106). The effective membrane area was ~13.6 cm$^2$ and all the experiments were performed at ambient conditions (~21° C.) with a nitrogen pressure of 0.5 bar.

Performances of the membranes as a function of membrane thickness were first evaluated by measuring the pure water permeability (RO water) and the retention for Methyl Red (an electroneutral probe molecule at pH~5.5 37) (see FIGS. 22 and 23).

Permeability of the membrane (with units of 1 h$^{-1}$ m$^{-2}$ bar$^{-1}$) for pure water or water/probe molecule solutions was determined after a constant flux was obtained, typically after 1 hour of permeation, and calculated by:

$$\text{Permeability} = \frac{V_p}{t \cdot A \cdot \Delta P}$$

Where $V_p$ is the permeate volume, t is the permeation time, A is the active area of the membrane and $\Delta P$ is the imposed nitrogen pressure.

Membranes with ~150 nm thickness were found to exhibit the most promising trade-off between flux and retention. Consequently, this membrane was chosen for further characterizations. The retention of this membrane was evaluated for different probe molecules varying in size and charge using a dead-end filtration apparatus. Note: where applicable the hydrated radii of probe molecules were estimated by the correlation between the hydrated radius and the radius estimated from the Connolly Accessible Area (CAA). The probe molecules with different charges and hydrated radii included: Methyl Viologen (positive charge, at pH 6), Methyl Orange (negative charge at pH 6), Methylene Blue (positive charge at pH 6.5), Orange G (negative charge at pH 6), Rhodamine B (electroneutral at pH 6 (electroneutral at pH 6), Tris(bipyridine) ruthenium(II) chloride (Ruthenium II) (positive charge at pH 6), Methyl Blue (negative charge at pH 6), Brilliant Blue (negative charge at pH 6.5), and Rose Bengal (negative charge at pH 6).

To evaluate the retention performance of the membrane the stirred cell was filled with 10 mg/l of the test solutions. To diminish the role of adsorption, the membrane were pre-saturated by filtering ~20 ml of the test solution and then, to remove any solute adhered to the membrane surfaces, the membranes were thoroughly washed with ethanol, acetone and finally RO water (typically 50 ml of the solvent was added to the filtration cell and left stirring at 800 rpm for 5 mins). The retention performance of the membranes was evaluated by filling the cell with 100 ml of solution followed by applying a pressure to the membrane and allowing 20 ml to permeate through it. The 20 ml which permeated through the membrane and the 80 ml retentate were both collected and analysed. All tests were repeated five times. For accurate estimation of the concentration of the probe molecule in the retentate stream, all of the components which were in contact with the retentate solution in the filtration cell were rinsed, such as, the stirring apparatuses, interior walls of the cell, and the top surface of the membranes with 100 ml of RO water and accounted for during calculation of the retentate concentration.

FIG. 24 shows the results of exclusion testing of the membrane. FIG. 24(a) shows rejection characteristics of the membrane as a function of molecular weight on a 40 nm thick reduced-graphene oxide (R-GO) membrane under 2 bar pressure. The molecular weight cut-off (90% rejection) is 319 g/mol with a flux of 28 L/m$^2$ hr·bar. These results are based on sieving, after the membranes have stopped adsorption. FIG. 24(b) is a UV-vis spectra showing changes in the feed, retentate (residual) and permeates after 500 ml permeation, under 2 bar pressure. FIG. 24(c) is a photograph of the feed, retentate and filtered liquid showing removal of the probe molecules in the permeate and their concentration in the retentate. 2400 is a gold particle solution, 2402 Direct Yellow, 2404 Serva Blue, 2406 Methyl Blue, 2408 K$_3$[Fe(CN)$_6$], 2410 Methyl Viologen, 2412 Methylene Blue, and 2414 Rhodamine B. Solutions (a), (b), and (c) represent the feed, residual, and filter solutions for each respectively.

Prior to every experiment, the membranes were cleaned with ethanol, acetone, and RO water (as per the aforementioned procedure) followed by permeation of RO water until a stable permeability is observed. Cleaned membranes would exhibit the same pure water flux as a virgin membrane (~70 l m$^{-2}$ hr$^{-1}$ bar$^{-1}$ after ~1 h) which indicated that it was indeed clean and able to be used again. It is noteworthy, that the cleaning process removed most of the probe molecules adhered to the membrane surface and almost 100% recovery of flux (see FIGS. 25 and 26) is observed.

To calculate observation retention, R, (see FIG. 27) and the percentage of adsorption (see FIG. 28) the concentration of each probe molecule in the feed ($C_f$), the permeate ($C_p$), and the retentate ($C_r$) were evaluated by measuring the absorbance of the relevant peaks using a UV-vis spectrometer (Ocean Optics USB4000 using a quartz cuvette, 1/Q/10, Starna Cells Pty. Ltd. Australia).

$$R(\%) = \frac{C_f - C_p}{C_f} \times 100(\%)$$

$$Ads.(\%) = \frac{V_f C_f - (V_r C_r + V_p C_p)}{V_f C_f} \times 100(\%)$$

Figure 28:
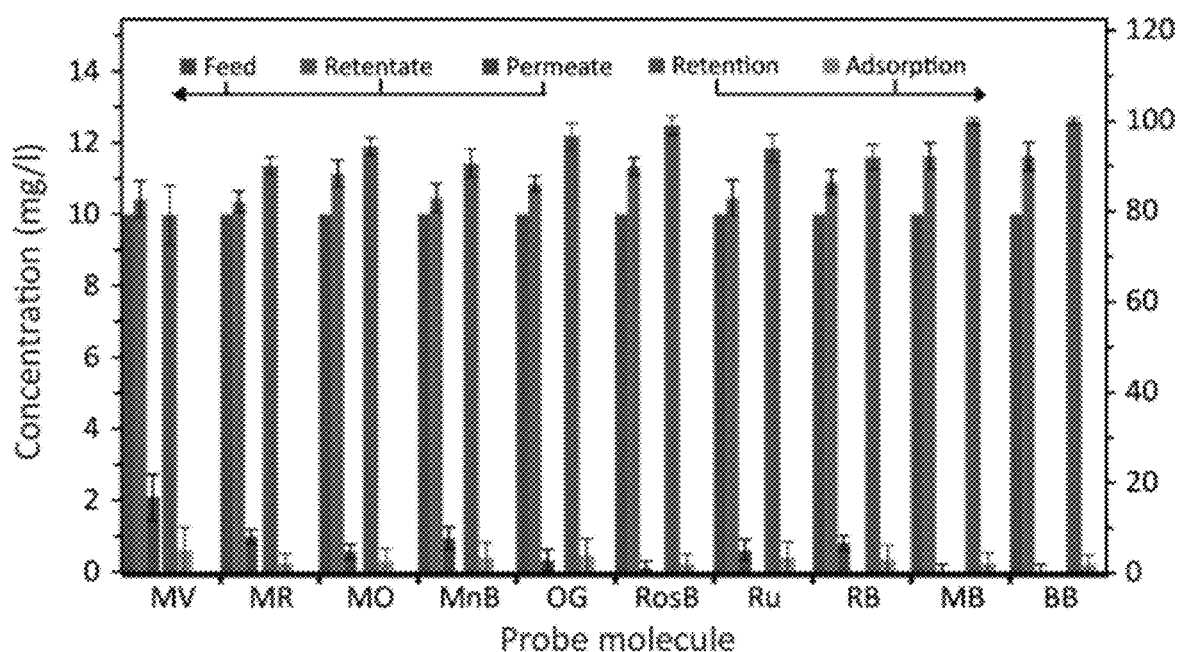

The flux through the membrane increases linearly with increasing applied pressure (FIG. 29). The modified Hagen-Poiseuille equation for slit-shaped pores $$\left(Flux \approx \frac{h^4 \Delta P}{12 L^2 \eta \Delta x}\right)$$

gives an approximate explanation of fluid flow through these multi-layered structures. Using this equation one can estimate the mass flow rate of a Newtonian fluid through porous materials per unit area (m$^3$ s$^{-1}$ m$^{-2}$), where h (m) ~0.95 nm is the distance between neighbouring graphene sheets (estimated from XRD, see FIG. 17), $\Delta P = 0.5 \times 10^5$ Pa is the pressure gradient, $L = 0.9 \times 10^{-6}$ m is the average lateral length of the graphene sheets, $\eta = 0.001$ Pa s is the viscosity of water at 20° C., and $\Delta x = 150 \times 10^{-9}$ m is the thickness of the membrane. Comparison of the experimental results with estimated fluxes from the modified Hagen-Poiseuille equation indicate that the theoretical fluxes are four orders of magnitude smaller than the experimental results. This experimental enhancement is consistent with reports of water transport in nanotubes and the slit-pores of graphene The membrane showed high retention (>90%) for charged and uncharged solutes with a hydrated radius above 5 Å (see FIG. 27). Retention mechanisms in membranes are reliant on size sieving, electrostatic repulsion and adsorption usually acting in tandem to affect separations. Sorption may dominate separations based on graphene-based materials, so it is necessary to identify which of these mechanisms are crucial to this membrane. FIG. 28 reports the analysis of feed, retentate, and permeate concentrations along with percent retention and percent adsorption in all the experiments. The results suggest that the retentate concentration is always larger than the feed concentration, while the adsorption percentage is less than 10%, irrespective of the probe molecule species in consideration (see FIG. 28). The permeability during filtration of the probe molecule was usually 90-95% of their clean water permeability (see FIG. 25) further supporting minimum sorption. Based on these measurements, one can argue that SAMs primarily sieve molecules when the average interlayer space of the graphene sheets approaches the physical size of the probe molecules, reported here as hydrated radius. It is also worth noting that the negatively charged probe molecules have higher retention than the positively charged molecules suggesting that electrostatic effects are also important.

The water permeability and the retention of methyl red, a probe molecule which is electroneutral at the experimental pH (~5.5), for the highly ordered SAM was also compared with the relatively disordered membranes commercially available or formed using the vacuum filtration method with varying membrane thickness, measured here by AFM (see FIGS. 22 and 23). As indicated, both the retention is enhanced and the water permeability is improved as a result of the stacking order in the SAM. Water flux versus pressure measurements for three different varieties of membrane: SAM, vacuum filtered, and a commercial membrane (NF270 membrane, Dow Chemical Company, USA) are shown in FIG. 29. The SAM had a water permeability of 71±5 l m$^{-2}$ hr$^{-1}$ bar$^{-1}$, which is almost 7 times better than vacuum filtration membranes (10±2 l m$^{-2}$ hr$^{-1}$ bar$^{-1}$) and almost 9 times better than the NF270 membrane while demonstrating comparable or better retention for the electroneutral probe—methyl red (see FIG. 29). Without wishing to be bound by theory, the inventors believe that the enhanced performance of the SAM membrane is a consequence of the highly ordered graphene channels in the membrane plane (see FIGS. 15 and 16). These highly ordered graphene sheets form well organized and precise channels in the plane of the membrane which facilitate water transport. In disordered membranes the graphene sheets have random orientation which leads to disordered channels with broad range of sizes (see FIG. 16). The random orientation of the graphene sheets could introduce multiple effects, such as, increased tortuosity, mechanical roughness and chaotic interconnectivity between GO sheets, which as a result increase the flow resistance of a membrane.

Solvent Testing

FIG. 30 shows the results of solvent permeability tests conducted on the membrane. FIG. 30(a) is a graph showing water flux versus applied pressure for the graphene oxide membrane of about 40 nm thickness showing a linear correlation between flux and applied pressure. FIG. 30(b) shows that the water flux of the membrane increases with reduction in time and increased hydrophobicity. FIG. 30(c) shows comparative flux of different solvents through the membrane. FIG. 30(d) provides a comparison of hexane and water flux through the membrane.

Salt Rejection Performance

To further illustrate that electrostatic effects are also important, the salt rejection performance of the GO membrane was examined by evaluating the retention of the selected monovalent and divalent salts, such as, $Na_2SO_4$, $MgSO_4$, $MgCl_2$, and $NaCl$, with a concentration of 2 g/l.

The filtration tests were performed using the same dead-end cell, with a nitrogen pressure of 0.5 bar. To minimize the concentration polarization effect on the retention performance, the feed solution was stirred at 800 rpm during the filtration. The tests were started by recording the permeability of the membranes for RO water until a stable condition was achieved (typically after 1 hour). Subsequently, RO water was replaced by 50 ml of the salt solution. The salt retention performance of the membranes was evaluated by filtering 10 ml of the initial feed. Before every experiment, the membrane was cleaned by filtering RO water through them until the permeability became stable and no evidence of salts were observed (typically after 1 h). The retention performances of the membrane for the salts were calculated as above. The concentration of the salts was measured by an ion conductivity meter (TPS Aqua C, Thermo Fisher Scientific).

The membrane showed retention between 30-40% for all the salts (see FIG. 31). The salt retention capability of the membrane is not surprising as the interlayer spacing is small (~9.5 Å) and the membrane is abundant with various negatively charged oxygen functional groups, such as carboxyl, hydroxyl and epoxy, which persist even after the mild reduction used in stabilizing the membrane (indicated by the FTIR results discussed above and illustrated in FIG. 20). These negatively charged groups particularly carboxylic acids, based on Donnan exclusion theory, will retain counter ions in order to maintain the electro-neutrality of the solution on each side of the membrane.

Long-Term Viability and Membrane Reuse

A key attribute of this SAM membrane is the stability in aqueous environments and that the retention is affected by sieving on the top surface of the membrane (see FIG. 26). This allows the membrane to be cleaned in polar and non-polar solvents for multiple reuse. Long term filtration tests (over 24 hours at 0.5 bar pressure) were carried out with Bovine Serum Albumin (BSA), a common laboratory model foulant in membrane fouling studies In order to evaluate the long-term viability and the reusability of these membranes, 100 ppm of Bovine Serum Albumin (BSA) was filtered as a common model protein for antifouling tests. The fouling tests were performed in the dead-end stirred filtration cell (Sterlitech HP4750) attached with a 4.5 litre dispensing vessel, under constant stirring at 800 rpm (to minimize concentration polarization) and a nitrogen pressure of 0.5 bar. The test was started by recording permeability of the membrane for RO water until a constant flux was obtained, typically after 1 hour ($j_{w,1}$). The initial RO feed was removed and replaced by the BSA solution. Upon the commencement of the 0.5 bar pressure, permeate was weighed and collected using a Sartorius scale customised with a Labview interface. This completes the first cycle. Once the BSA test has completed, the membrane was cleaned by ethanol, acetone and RO water following the cleaning procedure discussed above. The filtration of the BSA solution continued for 5 hours (5 cycles). The aforementioned procedure is now repeated again with the second RO water permeability designated as $j_{w,2}$. Five cycles were completed in total (see FIG. 32). Although industrially relevant cleaning protocols for membranes require the use of alkalis and acids, the choice of the cleaning solution for these studies was based on the ability of the GO membranes to have chemical resistance towards solvents such as acetone and ethanol.

Antifouling behaviour of the shear-aligned membrane due to the chemical cleaning was evaluated by the flux recovery (FR), which is calculated by the following equation:

$$FR_i(\%) = \left(\frac{j_{w,i}}{j_{w,1}}\right) \times 100$$

Where, $j_{w,1}$ is the initial flux of the membrane for RO water before the first cycle, $j_{w,i}$ is the membrane flux (after cleaning the membrane by ethanol and acetone and RO water) for RO water after cycle i.

The SAM showed fouling resistance and flux was recovered by a simple solvent cleaning (see FIG. 32). The fouling behaviour of membrane strongly depends on physical and chemical characteristics of the membrane surface such as pore size, porosity, pore morphology, and most importantly the hydrophobicity. Fortunately, the SAM retained hydrophilic groups (see FIG. 20) which decreased hydrophobic interaction with the organic probes and proteins. As a result a simple cleaning procedure by using ethanol, acetone and RO water effectively recovered more than 90% of the flux after every cleaning cycle—this was true for the probe molecules and also for stronger foulant such as BSA (see FIGS. 25, 26, and 32).

Vacuum Filtration Membrane

To elucidate the role of stacking order imposed by shear alignment, various properties of SAM with those prepared using the vacuum filtration technique have also been compared. For this comparison, GO membranes were prepared by vacuum filtration whilst keeping all other variables such as the batch of GO and chemical reduction virtually the same. The synthesis procedure is outlined below.

A 10 µg/l GO solution (from same stock of GO) was filtered through the same porous Nylon support (Nylon 66, pore size 0.2 µm, MDI, India) using a vacuum filtration pump (KNF pump, model: N 810(3) FT.18). Different thicknesses of GO membranes were prepared by changing the volume of the GO solution in the vacuum filtration process. These GO membranes were further reduced via hydrazine vapour following the same methodology used for SAM. The membranes then were characterised by polarized light microscopy (see FIG. 15), X-ray diffraction analysis (see FIG. 16), and AFM (see FIGS. 22 and 23 and a series of nanofiltration tests (see FIGS. 22 and 23).

Polarized light imaging measures the local orientation order by imaging the slow axis of alignment of the graphene sheets in the plane of the membrane, while XRD measures the crystalline order of the interlayer spacing.

Both of these techniques support the hypothesis of a highly ordered structure in the SAM (see FIGS. 15 and 16). Interestingly the graphene sheets that comprise the film have a lateral dimension of ~900 nm, while the membrane itself is much thinner (see FIGS. 18 and 19)—this strongly suggests that the shear stress orients the sheets into the plane of the substrate. The in-plane orientation of the graphene sheets is consistent with flow alignment of discotic nematic liquid crystals under a shear flow field. This remarkably high order is unique to the SAM processing approach and the key distinction of shear-alignment with other processing approaches (see FIGS. 15 and 16).

It will be understood that the invention disclosed and defined in this specification extends to all alternative combinations of two or more of the individual features mentioned or evident from the text or drawings. All of these different combinations constitute various alternative aspects of the invention.

What is claimed is:

1. A method of forming an asymmetric graphene oxide membrane suitable for the separation of molecules with a molecular weight in the range of 200-800 Da in a membrane separation process, wherein the membrane is prepared by a method of forming a film of a stabilized solution of discotic nematic graphene oxide on a substrate surface, the method comprising:

applying an amount of the solution of discotic graphene oxide in a nematic crystalline state with a graphene oxide concentration of 16 mg/mL or greater to the substrate surface;

drawing the solution through a rectangular channel defined by two opposing surfaces having a gap there between at a shear rate of from 1,000 to 10,000 per second determined according to the Navier-Stokes equation assuming that fluid flow is Newtonian, wherein a first opposing surface of the channel is the substrate surface; and forming a film of aligned discotic graphene oxide having a thickness corresponding to a length of the gap;

wherein the substrate is a porous substrate selected from the group consisting of polymers, metals, and ceramics, having pore sizes in the range of from 20 nm to 1000 nm; and wherein a second opposing surface is an applicator surface of a coating apparatus selected from the group consisting of: a rod coater, a roll coater, a knife coater, a flexible applicator, a curtain coater, and a gravure coater; and the step of drawing the solution through the channel comprises moving the two opposing surfaces relative to one another.

2. The method of claim 1, wherein the graphene oxide concentration is 20 mg/mL or greater.

3. The method of claim 1, wherein the method further comprises treating the film to remove at least some functional groups that are present on the film.

4. The method of claim 3, wherein the step of treating the film comprises chemical treatment with a compound selected from the group consisting of: hydrazine, sodium borohydrate, citrates, NaOH, KOH, or a combination thereof to form a reduced graphene oxide film.

5. The method of claim 3, wherein the step of treating the film comprises physical treatment with plasma, ion-beams, heat, UV light, or a combination thereof.

6. The method of claim 1, wherein the solution of discotic graphene oxide in a nematic crystalline state with a graphene oxide concentration of 16 mg/mL or greater is obtained by concentrating a more dilute solution of the discotic graphene oxide by mixing the more dilute solution with hydrogel beads and separating the hydrogel beads from the suspension.

* * * * *